US012509345B2

(12) United States Patent
Conrad et al.

(10) Patent No.: US 12,509,345 B2
(45) Date of Patent: Dec. 30, 2025

(54) MICROELECTROMECHANICAL ACOUSTIC PRESSURE-GENERATING DEVICE WITH IMPROVED DRIVE

(71) Applicant: Robert Bosch GmbH, Stuttgart (DE)

(72) Inventors: Holger Conrad, Dresden (DE); Anartz Unamuno, Dresden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 376 days.

(21) Appl. No.: 18/210,640

(22) Filed: Jun. 15, 2023

(65) Prior Publication Data

US 2023/0416076 A1   Dec. 28, 2023

(51) Int. Cl.
*B81B 3/00*   (2006.01)

(52) U.S. Cl.
CPC .... *B81B 3/0021* (2013.01); *B81B 2201/0257* (2013.01); *B81B 2203/0315* (2013.01); *B81B 2203/0323* (2013.01); *B81B 2203/04* (2013.01); *B81B 2207/053* (2013.01); *B81B 2207/09* (2013.01)

(58) Field of Classification Search
CPC .............. H04R 19/005; H04R 19/02; H04R 2201/003; B81B 3/0021; B81B 2201/0257; B81B 2203/0315; B81B 2203/0323; B81B 2203/04; B81B 2207/053; B81B 2207/09
See application file for complete search history.

(56) References Cited

U.S. PATENT DOCUMENTS

| | | | |
|---|---|---|---|
| 2011/0182150 A1 | 7/2011 | Cohen | |
| 2018/0234783 A1* | 8/2018 | Clerici | H04R 17/00 |
| 2019/0208330 A1* | 7/2019 | Bretthauer | B81B 3/0021 |
| 2020/0236470 A1* | 7/2020 | Cerini | H04R 1/025 |
| 2021/0329386 A1* | 10/2021 | Wen | H04R 1/023 |
| 2022/0360908 A1* | 11/2022 | Rusconi Clerici Beltrami | B81B 3/007 |

(Continued)

FOREIGN PATENT DOCUMENTS

| | | |
|---|---|---|
| WO | 2015195952 A1 | 12/2015 |
| WO | 2022117197 A1 | 6/2022 |

OTHER PUBLICATIONS

European Search Report; Application No. 22180979.1; date May 12, 2022.

*Primary Examiner* — Moazzam Hossain
(74) *Attorney, Agent, or Firm* — Fletcher Yoder, P.C.

(57) ABSTRACT

The invention generally relates to drives for microelectromechanical acoustic pressure-generating device, which may be implemented in a microelectromechanical system (MEMS). In some embodiments of the invention, the microelectromechanical acoustic pressure-generating device is implemented in a chip/die, e.g. in form of a System-on-Chip (SoC) or a System-in-Package (SiP). Further embodiments of the invention relate to the use of such acoustic pressure-generating device in a microelectromechanical loudspeaker system, for example, headphones, hearing-aids, or the like. Embodiments of the invention relate to the miniaturization of the device. Some of the embodiments focus on countermeasures that reduce the pull-in force, which can facilitate further miniaturization of the microelectromechanical acoustic pressure-generating device.

15 Claims, 19 Drawing Sheets

(56) References Cited

U.S. PATENT DOCUMENTS

2023/0322546 A1* 10/2023 Langa .................. H04R 19/005
 257/415
2023/0412968 A1* 12/2023 Bretthauer ........... H04R 23/002

* cited by examiner

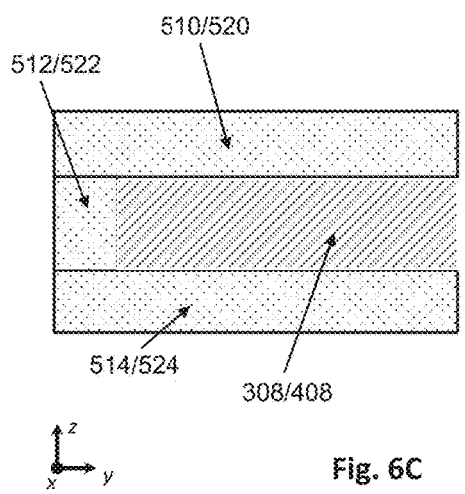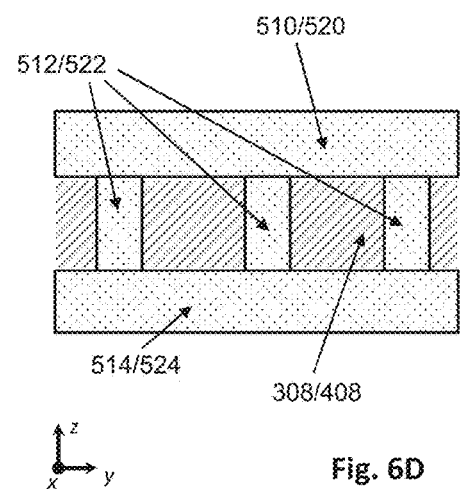

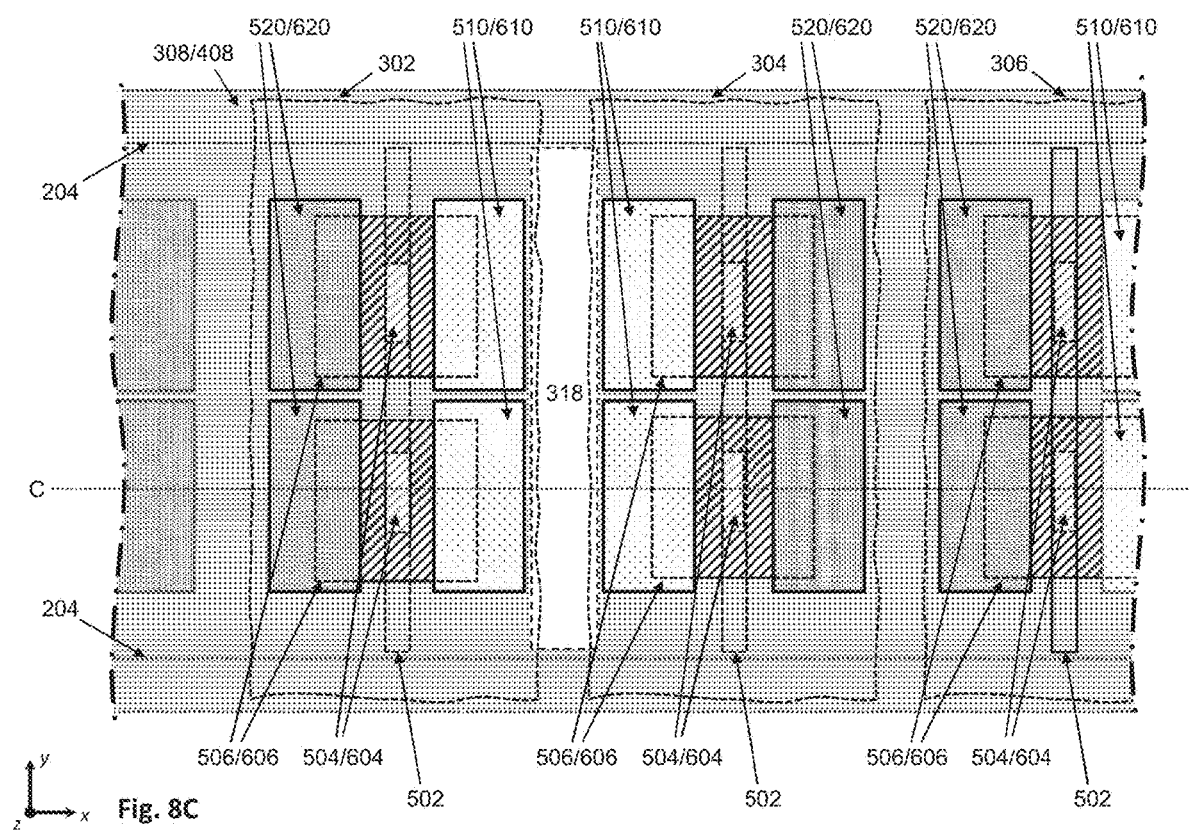

MICROELECTROMECHANICAL ACOUSTIC PRESSURE-GENERATING DEVICE WITH IMPROVED DRIVE

CROSS-REFERENCE TO RELATED APPLICATIONS

This application claims priority to EP Application No. 22180979.1, filed Jun. 24, 2022, entitled "Microelectromechanical Acoustic Pressure-Generating Device with Improved Drive," the disclosure of which is incorporated by reference in its entirety for all purposes.

TECHNICAL FIELD

Embodiments of the invention generally relate to drives for microelectromechanical acoustic pressure-generating device, which may be implemented in a microelectromechanical system (MEMS). In some embodiments of the invention, the microelectromechanical acoustic pressure-generating device is implemented in a chip/die, e.g. in form of a System-on-Chip (SoC) or a System-in-Package (SiP). Further embodiments of the invention relate to the use of such acoustic pressure-generating device in a microelectromechanical loudspeaker system, for example, headphones, hearing-aids, or the like.

BACKGROUND

The principle of a Nanoscopic Electrostatic Drive (NED) is described the patent application WO 2012/095185 A1. NED refers to a MEMS-based actuator principle. The movable elements forming the actuators are formed from a silicon material, which has at least two spaced electrodes. The length of the electrodes is much greater than the thickness of the electrodes and also the height of the electrodes, i.e. the dimension along the depth direction of the silicon material. These bar-shaped electrodes are spaced apart from each other and are locally electrically insulated and fixed from each other. By applying an electric potential, an electric field is generated between these electrodes, resulting in attractive or repulsive forces between the electrodes and thus stresses in the material of the electrodes. The material strives to homogenize these stresses by trying to adopt a possible low-stress state, resulting in movement. Through a certain geometry and topography of the electrodes, this movement can be influenced in such a way that the electrodes change in length and thus a lateral movement of the deflectable element takes place.

Specific implementations and improvements of micromechanical devices using a NED are described in the art, e.g. in U.S. Pat. No. 10,457,544 B2, WO 2020/078541 A1 and, DE 10 2019 203 914 B3, each of which is incorporated herein by reference. In those micromechanical devices, several in-plane moving actuators cause a modulation of the pressure of a volume of air located between the actuators. The micromechanical devices can be used as in-ear sound transducer systems. The pressure modulation in the component leads to audible sound inside the ear canal.

Another type of NED-based micromechanical device is described in the patent application WO 2022/11717 A1 (application no. PCT/EP2020/084506), the contents of which is incorporated herein by reference. FIG. 1A shows a cross-section of the micromechanical device described in WO 2022/11717 A1 (application no. PCT/EP2020/084506). A plurality of fins is arranged between a top and a bottom wafer. A volume (air chamber) is provided between the fins which is connected to the air volume of the ear canal via the outlet slots and inlet slots. An air gap is provided above the fins. Above the air gap, which is approximately 100 to 300 nm thin, two electrodes $+V_{dc}$ and $-V_{dc}$ are provided. The air gap is located (on both sides) between the fin wafer and the cover wafer (or lid wafer) and between the fin wafer and the bottom wafer (or base wafer). DC thin-film electrodes $+V_{dc}$ and $-V_{dc}$ are located on the inside of the lid wafer and on the inside of the bottom wafer.

A cross section of a real implementation of a micromechanical device described in WO 2022/11717 A1 (application no. PCT/EP2020/084506) is shown in FIG. 1B. Notably, the fabricated fins have a straight/rectangular cross-section and do not have to have a taper in the center of the fin.

The fins are driven such that a DC voltage $V_{dc}$ is applied to the two DC electrodes and an AC voltage $V_{ac}$ (corresponding to the audio signal voltage) is applied to the fins. The electrostatic fields between the DC and AC electrodes result in a fin drive force $F_x$, which deflects the fin in lateral direction x within the chip plane (see FIG. 1A). The driving force can be approximated using the formula:

$$F_x = \frac{1}{2} \frac{\partial C}{\partial x} \cdot 4 V_{dc} \cdot V_{ac} \text{ with}$$

$$\frac{\partial C}{\partial x} = 2 \cdot \varepsilon_r \varepsilon_0 \cdot \frac{L}{g_0}$$

Here is $\partial C/\partial x$ is the relative capacitance change, $\varepsilon_r$ is the material-dependent permittivity (air: $\varepsilon_r=1$), $\varepsilon_0$ is the electric field constant, L is the fin length (extent in y-direction) and $g_0$ is the gap distance (air gap) between the fin and the DC electrodes.

In designing a micromechanical device exemplarily described in WO 2022/11717 A1 (application no. PCT/EP2020/084506), in addition to the electrostatic driving force $F_x$, the stiffness of the fin (defined by length in y-direction and width in x-direction) and the fluidic backpressure (defined by the distance between the fins and the size of the air outlet slots) are further design parameters.

Several problems exist in the design of microelectromechanical acoustic pressure-generating devices as described in the art. One of the technical problems encountered is electromechanical overdrive. If lateral deflections of the fin exceed the insulation gap $g_0$ between the electrodes $+V_{dc}$ and $-V_{dc}$ are present, sudden changes in the driving force $F_x$ will occur. The sudden changes in the driving force $F_x$ will result in an abrupt change of the excursion and a higher nonlinear distortion (Total Harmonic Distortion (THD)) of the sound pressure in the micro loudspeaker can result therefrom. Favorable here is a depth etch profile that tapers in the middle of the fin, as indicated in FIG. 1A is indicated. In other words, it may be desirable for the fin to have a wide cross section on its upper and lower sides and a narrow cross section in the center of the fin. However, the fabrication of such a fin cross-section may be difficult to achieve when using semiconductor manufacturing processes.

A further problem are the device characteristics resulting from wafer bonding during manufacturing of microelectromechanical acoustic pressure-generating devices built from multiple wafers. As explained in connection with FIG. 1A, a microelectromechanical acoustic pressure-generating device can be assembled from, for example, three wafers by wafer bonding. The bonding of wafers may result in the following problems/issues:

The lateral (x-) alignment of the wafers must be very precise. Misalignment of the wafers will limit the performance of the device and may result in limited design space. Alignment tolerances of 1 to 10 μm are typical for direct wafer bonding (silicon or $SiO_2$) and thermo-compression bonding (metals). It would be desirable if such tolerances, which are very large for MEMS, could be reduced or even eliminated.

Wafer bonding can change the gap size $g_0$ above and below the fins, which can lead to an increase of vertical asymmetries and consequently an increase of the vertical pull-in effects (discussed below).

Bonding multiple wafers increases the thicknesses of the MEMS. A further disadvantage of wafer bonding are larger height differences of the electrical contacts that need to be handled (e.g. by wire contacts/wire bonds or by through-silicon-vias/TSVs), which in turn increases the manufacturing costs.

As noted, another design aspect is the pull-in effect. For small gap distances $g_0$ (which may be as small as a hundred to a few hundreds of nanometers), large vertical electrostatic forces $F_z$ (see FIG. 1A) can bend the lid and bottom wafer, but also the fins in the z-direction. If the device has perfect symmetry in z-direction (thickness direction), the vertical forces $F_z$ compensate for each other. However, if the symmetry deviates slightly (e.g. due to manufacturing tolerances), the force $F_z$ can cause the fin to reach an unstable equilibrium together with the lid or bottom contacts. This problem is well known in the field of MEMS-based actuator designs as the "pull-in effect".

The pull-in effect means that, starting from a pull-in voltage, the fins and/or parts of the lid or bottom wafer are attracted to each other or accelerated towards each other, and can subsequently stick firmly together ("sticking"). For microelectromechanical acoustic pressure-generating devices this means that the fin sticks to the lid or base, thereby causing a short circuit or even rubbing during operation of the microelectromechanical acoustic pressure-generating devices, which can lead to high acoustic distortion and poor audio quality. It is thus important for all MEMS-based microelectromechanical acoustic pressure-generating devices to avoid the pull-in to ensure proper operation of the microelectromechanical acoustic pressure-generating devices. Typically, microelectromechanical acoustic pressure-generating devices are therefore designed with a safety margin that limits the maximum drive voltage to approximately 70% of the pull-in voltage.

When designing an actuator for microelectromechanical acoustic pressure-generating devices, the "dilemma" arises that for large sound pressures, large actuator forces $F_x$ and small gap distances $g_0$ (in the range of a few 100 nanometers) are desirable. However, this results in high vertical forces $F_z$, which may need mechanical "absorption" or support via a suitably high z-stiffness of the fin as well as a sufficiently high z-stiffness of the top and bottom wafers. To achieve high stiffness in the z-direction, it would be thus preferable if the actuator wafer, lid wafer and bottom wafers have large thicknesses (in the range of several 100 μm up to one mm). This is however not desirable, as this would result in larger device thickness of the MEMS and also for the overall system in which it is used.

Within this context, there is a need to improve the design of microelectromechanical acoustic pressure-generating devices.

BRIEF SUMMARY OF THE INVENTION

This Brief Summary is provided to introduce a selection of concepts in a simplified form that are further described below in the Detailed Description. This Summary is not intended to identify key features or essential features of the claimed subject matter.

One aspect of the invention is the miniaturization of a microelectromechanical acoustic pressure-generating device. According to this aspect, some of the embodiments focus on countermeasures that reduce the pull-in force, which can facilitate further miniaturization of the microelectromechanical acoustic pressure-generating device. It is another aspect of the invention, which can be implemented jointly with the aspect of miniaturization, to facilitate reduction of the number of wafers to form the microelectromechanical acoustic pressure-generating device. For example, in some embodiments, the physical device structures of the cover layer (and/or base layer) and the actuator layer may be formed on a single wafer/substrate. This can facilitate higher precision in the manufacturing of the device structures (e.g. of the drive mechanism) which can also support countermeasures that reduce the pull-in force.

In some embodiments related to the first aspect mentioned above, at least one end of the actuators of a microelectromechanical acoustic pressure-generating device may extend into a cutout region provided in the base layer and/or cover layer of the microelectromechanical acoustic pressure-generating device. The one or more ends of the actuator may be provided with a structure that extends (substantially) in parallel with plane of the base layer and/or cover layer in the cutout region. The cutout regions may form a part of actuator drive portions in the base layer and/or cover layer. It is also possible that some of or all the cutout regions form a part of actuator drive portions in the layers of the microelectromechanical acoustic pressure-generating device in which the actuators are formed. Each actuator drive portion can be provided with a pair of electrode arrangements. The electrode arrangements each have multiple electrode portions extending (substantially) in parallel with plane of the base layer and/or cover layer. The electrode portions of the pair of electrode arrangements are provided in and/or define at least a portion of an associated cutout region. The electrode portions of a given electrode arrangement may be arranged in parallel. The electrode portions of a given electrode arrangement may jointly form an electrode of the actuator drive portion. For this, the electrode portions of a given electrode arrangement may be (electrically) interconnected with each other in the device structure, which is however not mandatory.

The electrode portions of a given electrode arrangement may partially overlap with the structure at an end of an actuator reaching into the associated cutout region, so that gaps are provided in a direction across the plane of the base layer and/or cover layer between the structure at an end of an actuator and the individual electrode portions of the given electrode arrangement. For example, as will become clearer from the embodiments described below, the electrode portions of a given electrode arrangement may thus have a U-shape, an E-shape or a comb-shape. The structures provided a one or both ends of the actuators may have corresponding shapes that match with the shape of associated pair(s) of electrode arrangements so that the structures reach into a space provided in between the electrode portions of the associated pair(s) of electrode arrangements (for example, if the associated pair(s) of electrode arrangements have an E-shaped cross section, the structure(s) at the one or both ends of the actuator may have a U-shaped cross sections so that the legs of the U-shaped structure can protrude in in between the legs of the E-shaped electrode arrangements).

Embodiments of the invention provide a microelectromechanical acoustic pressure-generating device implemented in MEMS. The microelectromechanical acoustic pressure-generating device comprises a layer system. The layer system comprises or consists of a plurality of layers. The acoustic pressure may also be referred to as an air pulse, which may be for example, sound, ultrasound or voice. The layers of the layer system form a planar cover (e.g. in one or more cover layers, sometimes also collectively referred to as a "cover layer" herein), a planar base (e.g. in one or more base layers sometimes also collectively referred to as a "base layer" herein) and device layers, comprising the actuator layers and sidewalls (e.g. in one or more actuator layers, sometimes also collectively referred to as a "actuator layer" herein) arranged to enclose a cavity between the cover and the base. The layered system further includes a plurality of movable actuators for generating an acoustic pressure (e.g. the actuators may be provided in the one or more actuator layers). Optionally, additional layers can be provided on or connected to the bottom and/or cover layer (e.g. layers comprising application-specific integrated circuits, hard-wired circuitry or through silicon vias), whereby the individual layers do not have to completely cover each other.

Each of the movable actuators comprises a planar first leg extending (substantially) in the first direction (y-direction in the detailed embodiments described herein, in the following "y-direction") and a second direction (x-direction in the detailed embodiments described herein, in the following "x-direction") perpendicular to the first direction (y-direction), and a planar second leg extending (substantially) in the first direction (y-direction) and a third direction (z-direction in the detailed embodiments described herein, in the following "z-direction") perpendicular the first direction (y-direction) and the second direction (x-direction) into the cavity. The first leg and the second leg are connected to each other through one or more coupling portions. The first leg is an example of a structure provided at an end of the actuator. The first leg may also be referred to as a "finger". The second leg may also be referred to as a "fin" or "fin portion" of the actuator.

A plurality of actuator drive portions may be formed in a first subset of the layers of the layered system. Each of the actuator drive portions comprises a pair of electrode arrangements. Each electrode arrangement comprises a planar first electrode portion and a planar second electrode portion, both (substantially) extending in the first direction (y-direction) and the second direction (x-direction) and spaced from each other in the third direction (z-direction) to provide a groove in between the first and second electrode portion of the respective electrode arrangement. The grooves of each electrode arrangement are part of a respective cutout region of a respective actuator drive portion in the first subset of the layers of the layered system, each cutout region being connected with the cavity. The connection may be or may not be a fluid connection (e.g. depending on the size of the gaps and the viscosity of the air). Further, each of the actuator drive portions accommodates the first leg of one or more of said actuators in its cutout region. The (two) ends of the first leg of each of the one or more of said actuators protrude into the grooves of the cutout region of the respective actuator drive portion.

In this disclosure a structure (e.g. a leg of the actuator) "extending (substantially)" in two directions (first and second directions) of three directions perpendicular to each other means that the structure is (substantially) a plate-shaped or flat structure extending in the two directions. Although such structures "extending (substantially)" in two directions can have a (substantially) rectangular outline when viewed in a direction perpendicular to the plane spanned by the two directions, the embodiments of the invention are not so limited and may also encompass arbitrary flat structures that facilitate the desired functionality. Flat means that the thickness of the structure in the third direction (other than the two directions) is significantly smaller than the extend of the structure in the two directions. Further, since the microelectromechanical acoustic pressure-generating device may be implemented in a MEMS using semiconductor manufacturing processes, the term "substantially" is used to express that the planes and edges of a structure may not be perfectly flat or straight in a mathematical sense due to tolerances in the manufacturing process.

According to further embodiments, for each of the actuator drive portions in the subset of the layers of the layered system, a first gap ($g_0$) is formed between one end of the second leg of a respective actuator and the first electrode portion of an associated electrode arrangement and a second gap ($g_1$) is formed between the said one end of the second leg of the respective actuator and a second electrode portion of the associated electrode arrangement, wherein the first gap ($g_0$) is equal to the second gap ($g_1$).

Optionally, and according to further embodiments, for each of the actuator drive portions, a third gap ($g_2$) is formed between the other end of the second leg of a respective actuator and the first planar electrode portion of another associated electrode arrangement and a fourth gap ($g_3$) is formed between the said one end of the second leg of the respective actuator and a second electrode portion of the other associated electrode arrangement, wherein the third gap ($g_2$) is equal to the fourth gap ($g_3$). For each of the actuator drive portions, the first gap ($g_0$), the second gap ($g_1$), the third gap ($g_2$) and the fourth gap ($g_3$) may all be equal.

In some embodiments, the gap size is in the range inclusive 100 nm and inclusive 4.0 μm. In some embodiments, the gap size is in the range inclusive 200 nm and inclusive 400 nm.

In example embodiments of the microelectromechanical acoustic pressure-generating device, the layers of the layered system forming the cover or the base comprise or correspond to the subset of the layers of the layered system in which the actuator drive portions are formed.

In example embodiments of the microelectromechanical acoustic pressure-generating device, the layers in which the second legs of the actuators are formed comprise the subset of the layers of the layered system in which the actuator drive portions are formed.

Further embodiments of the invention relate to the electrode arrangements. In some embodiments of the invention, the grooves of the pair of electrode arrangement of each actuator drive portion (substantially) extend in the first direction (y-direction) and the second direction (x-direction) and face each other.

The cutout region may not be exclusively confined by a pair of electrode arrangements since some isolation is provided between the electrode arrangements. Accordingly, in some embodiments, the bottom surfaces of the second electrode portions of the pair of electrode arrangements of each actuator drive portion that face the cavity form part of a wall extending in the first direction (y-direction) and second direction (x-direction) limiting the cutout region of the respective actuator drive portion. Another or the remaining portion of the wall may be formed by some isolating material in between the two electrode arrangements.

As noted, the different electrode portions of a given electrode arrangement may be connected to form a "single" electrode. Accordingly, in some embodiments, the first electrode portion and the second electrode portion of each electrode arrangement form a single electrode of the actuator drive portions. For example, in each electrode arrangement, an electrically conductive connecting portion extending (substantially) in the first direction (y-direction) and third direction (z-direction) electrically connects the first electrode portion and the second electrode portion of the respective electrode arrangement. In some example implementations, the first electrode portion, the second electrode portion and the connecting portion of each electrode arrangement may have a U-shaped cross section providing said groove to receive an end of the first leg of one or more of said actuators. In a non-limiting example implementation, the first leg is provided at an end of the actuator and is connected to the second leg to form substantially a T-shape (in cross section).

In further embodiments of the invention, in each electrode arrangement, the distance between the first electrode portion and the second electrode portion is in the range inclusive 50 nm and inclusive 5.0 µm. In an advantageous implementation, the distance between the first electrode portion and the second electrode portion is in the range inclusive 500 nm and inclusive 4.0 µm.

In some embodiments, each of the movable actuators further comprises a planar third leg extending (substantially) in the first direction (y-direction) and the second direction (x-direction), wherein the third leg is connected to the second leg though one or more second coupling portions (substantially) extending in the third direction (z-direction) at the end of the second leg that is opposite the first leg. In a non-limiting example implementation, the first and third legs can be thus provided at both ends of the actuator and are connected to the second leg so as to respectively form substantially a T-shape (in cross section) at both ends of the actuator. Further a second plurality of actuator drive portions is formed in another, second subset of the layers of the layered system. Each of the second actuator drive portions comprises a pair of second electrode arrangements, wherein each second electrode arrangement comprises a planar first electrode portion and a planar second electrode portion, both (substantially) extending in the first direction (y-direction) and the second direction (x-direction) and spaced from each other in the third direction (z-direction) so as to provide a groove in between the first and second electrode portion of the respective electrode arrangement. The grooves of each electrode arrangement are part of a respective cutout region of a respective second actuator drive portion in the cover, each cutout region being connected with the cavity. Each of the second actuator drive portions accommodates the third leg of one or more of said actuators in its cutout region, wherein the ends of the third leg of each of the one or more of said actuators protrude into the grooves of the cutout region of the respective second actuator drive portion.

In a non-limiting example implementation of this embodiment, the layers of the layered system forming the cover comprise or correspond to the first subset of the layers of the layered system in which the first actuator drive portions are formed, and the layers of the layered system forming the base comprise or correspond to the second subset of the layers of the layered system in which the second actuator drive portions are formed.

As noted, the structures provided at the one or both ends of the actuators may have different cross sections. In some embodiments, each of the movable actuators further comprises a planar third leg extending (substantially) in the first direction (y-direction) and the second direction (x-direction), wherein the third leg is connected to the first leg though one or more coupling portions (substantially) extending in the third direction (z-direction). Each electrode arrangement of the (first) actuator drive portions further comprises a planar third electrode portion extending in the first direction (y-direction) and the second direction (x-direction) and spaced from the second electrode portion in the third direction (z-direction) so as to provide an additional groove of the electrode arrangement in the cutout region of the actuator drive portion. Each of the (first) actuator drive portions may thus also accommodate the third leg of one or more of said actuators. The ends of the third leg of each of the one or more of said actuators protrude into the grooves of the cutout region of the respective actuator drive portion.

In a more specific non-limiting example implementation, in each electrode arrangement, an electrically conductive connecting portion extending (substantially) in the first direction (y-direction) and third direction (z-direction) electrically connects the second electrode portion and the third electrode portion of the respective electrode arrangement. Further, in each electrode arrangement, the first, second, third electrode portions and their connecting portions may jointly have an E-shaped cross section in a plane normal to the first direction (y-direction).

In further non-limiting example implementations, each of the movable actuators may further comprise a planar fourth leg extending (substantially) in the first direction (y-direction) and the second direction (x-direction). The fourth leg is connected to the second leg though one or more second coupling portions (substantially) extending in the third direction (z-direction) at the end of the second leg that is opposite the first leg. A second plurality of actuator drive portions is formed in another, second subset of the layers of the layered system, wherein each of the second actuator drive portions comprises a pair of second electrode arrangements. Each second electrode arrangement may comprise a planar first electrode portion and a planar second electrode portion, both (substantially) extending in the first direction (y-direction) and the second direction (x-direction) and spaced from each other in the third direction (z-direction) so as to provide a groove in between the first and second electrode portion of the respective electrode arrangement. The grooves of each electrode arrangement are part of a respective cutout region of a respective second actuator drive portion in the cover. Each cutout region is connected to the cavity. Each of the second actuator drive portions may further accommodate the fourth leg of one or more of said actuators in its cutout region, wherein the ends of the fourth leg of each of the one or more of said actuators protrude into the grooves of the cutout region of the respective second actuator drive portion.

In further non-limiting example implementations, each of the movable actuators may further comprise a planar fifth leg extending (substantially) in the first direction (y-direction) and the second direction (x-direction). The fifth leg is connected to the fourth leg though one or more coupling portions (substantially) extending in the third direction (z-direction). Each second electrode arrangement of the second actuator drive portions may further comprise a planar third electrode portion extending in the first direction (y-direction) and the second direction (x-direction) and spaced from the second electrode portion in the third direction (z-direction) so as to provide an additional groove of the second electrode arrangement in the cutout region of the second actuator drive portion. Each of the second actuator drive portions may further accommodates the fifth leg of one or more of said actuators, wherein the ends of the fifth leg of each of the one or more of said actuators protrude into the grooves of the cutout region of the respective second actuator drive portion.

In further embodiments of the microelectromechanical acoustic pressure-generating device the subset of the layers of the layered system has a plurality of acoustic pressure-outlet openings between the actuator drive portions.

In some embodiments of the invention, each of the actuators is drivable by one or more of the actuator drive portions to generate an acoustic pressure.

Further embodiments of the invention provide a microelectromechanical loudspeaker system implemented as a system-on-chip or system-in-package. The microelectromechanical loudspeaker system comprises a microelectromechanical acoustic pressure-generating device according to one of the various embodiments and implementations exampled disclosed herein.

In some embodiments, the microelectromechanical loudspeaker system may further comprise one or more drive units which are configured to electrostatically drive the movable actuators of the microelectromechanical acoustic pressure-generating device through the actuator drive portions of the microelectromechanical acoustic pressure-generating device. For example, a differential driving scheme may be used to drive the actuator drive portions and the actuators of the microelectromechanical acoustic pressure-generating device.

In further embodiments, a structure providing a back-volume of the microelectromechanical loudspeaker system is attached to the base-side of the acoustic pressure-generating device. The structure providing a back-volume may be for example formed in a larger device that includes the microelectromechanical loudspeaker system, e.g. near-field speaker, a headset or hearing aid.

In other embodiments, a microphone may be mounted on the cover or integrated in the cover of the microelectromechanical acoustic pressure-generating device. The microphone may be positioned adjacent to at least one acoustic pressure-outlet opening provided in the cover. The microelectromechanical loudspeaker system may optionally implement an active noise cancelling (ANC) function. The microphone may be configured to detect an acoustic pressure emitted through the acoustic pressure-outlet openings of the cover and interference noise; and the microelectromechanical loudspeaker system further comprises a control system configured to control the acoustic pressure generation of the microelectromechanical acoustic pressure-generating device based on the sound detected by the microphone and interference noise such that the detected interference noise is suppressed.

Further embodiments provide a device with a loudspeaker system according one of the embodiments and example implementations thereof disclosed herein, wherein the device is a near-field speaker, a headphone, or a hearing aid.

Another embodiment relates to a microelectromechanical acoustic pressure-generating device implemented in a MEMS. The microelectromechanical acoustic pressure-generating device comprises a planar cover, a planar base and sidewalls arranged to enclose a hollow space between the cover and the base, and a plurality of movable actuators. Each of the movable actuators comprises a drive structure that includes a planar first leg extending (substantially) in the first direction (y-direction) and a second leg (x-direction) perpendicular to the first direction (y-direction), and a planar fin extending (substantially) in the first direction (y-direction) and a third direction (z-direction) perpendicular the first direction (y-direction) and the second direction (x-direction) into the hollow space, The first leg and the fin are connected to each other at one or more coupling points. A plurality of actuator drive portions is formed in the cover or the base, wherein each of the actuator drive portions comprises a pair of electrode arrangements. Each electrode arrangement comprises a planar first electrode portion and a planar second electrode portion, both (substantially) extending in the first direction (y-direction) and the second direction (x-direction) and spaced from each other in the third direction (z-direction) so as to provide a groove in between the first and second electrode portion of the respective electrode arrangement. The grooves of each electrode arrangement are part of a respective cutout region of a respective actuator drive portion in the cover or the base, each cutout region being connected with the hollow space. Each of the actuator drive portions accommodates the first leg of one or more of said actuators in its cutout region, wherein the ends of the first leg of each of the one or more of said actuators protrude into the grooves of the cutout region of the respective actuator drive portion.

BRIEF DESCRIPTION OF THE DRAWINGS

The present description will be better understood from the following detailed description read in light of the accompanying drawings, wherein like reference numerals are used to designate like parts in the accompanying description.

FIGS. 6A to 6D show different cross sections of an electrode arrangement of an actuator drive portion shown in FIGS. 5A and 5B in accordance with different exemplary embodiments of the invention;

FIGS. 8A to 8C show different cross sections the portion of the microelectromechanical acoustic pressure-generating device in FIGS. 3 and 4 in accordance with different exemplary embodiments of the invention;

DETAILED DESCRIPTION

Different embodiments of the invention will be outlined in the following in more detail. As noted, this disclosure generally relates to a microelectromechanical acoustic pressure-generating device and its use in a loudspeaker system. The microelectromechanical acoustic pressure-generating device and/or a loudspeaker system including the microelectromechanical acoustic pressure-generating device can be implemented as a chip/die, e.g. as a System-on-Chip (SoC) or a System-in-Package (SiP).

Embodiments of the invention may facilitate further miniaturization of a microelectromechanical acoustic pressure-generating device. Some of the embodiments focus on countermeasures that reduce the pull-in force, which can facilitate further miniaturization of the microelectromechanical acoustic pressure-generating device, as will be outlined herein below in connection with FIGS. 5A and 5B in more detail. The proposed solutions for reducing or compensating the pull-in force discussed herein may also facilitate a reduction of the number of wafers to form the microelectromechanical acoustic pressure-generating device as the proposed solutions for reducing or compensating the pull-in force can also be used when manufacturing the microelectromechanical acoustic pressure-generating device using semiconductor processing techniques. For example, in some embodiments, the physical device structures of the cover layer (and/or base layer) and the actuator layer may be formed on a single wafer/substrate. This can facilitate higher precision in the manufacturing of the device structures (e.g. of the drive mechanism) which can also support countermeasures that reduce the pull-in force.

Figure 2A:
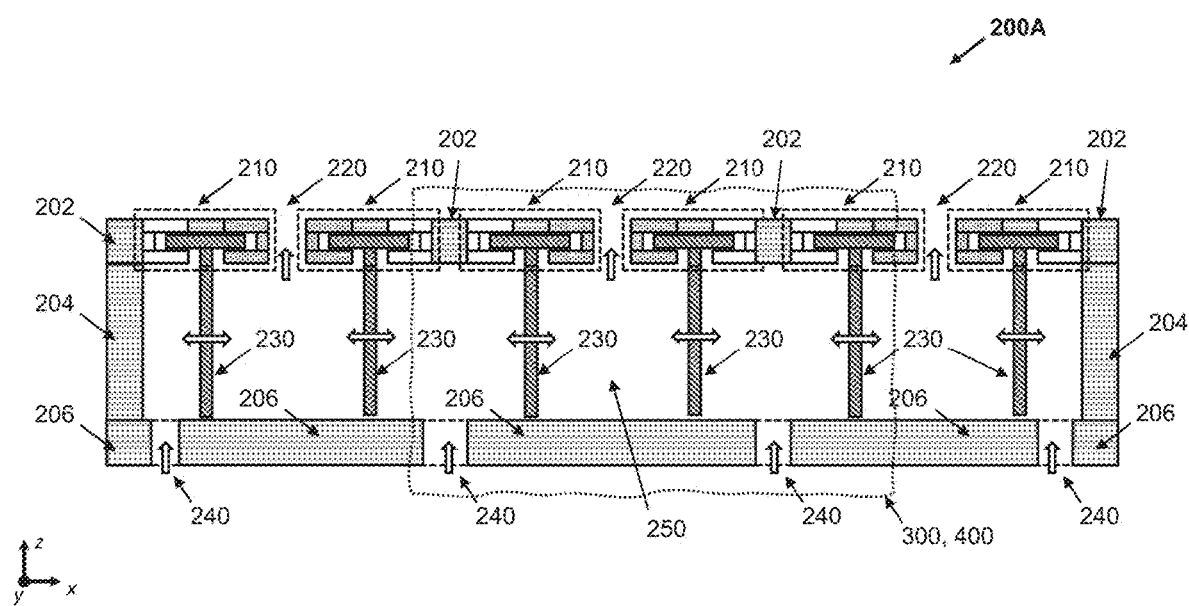
FIG. 2A shows a cross section of a microelectromechanical acoustic pressure-generating device in accordance with an exemplary embodiment of the invention.
Figure 8A:
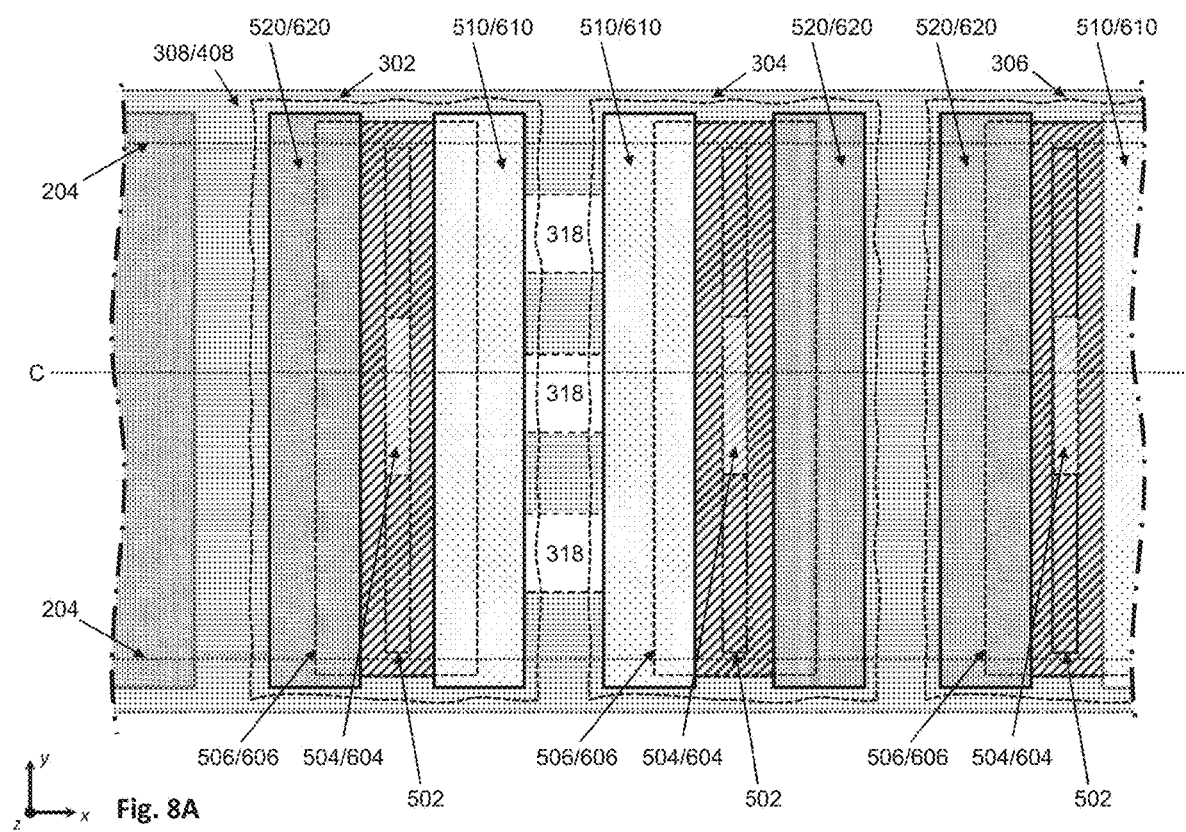

FIG. 2A shows a cross section of a microelectromechanical acoustic pressure-generating device 200A in accordance with an exemplary embodiment of the invention. In general, the shown cross section may be considered a common cross section in the x-z plane that shows a projection of the interior of the microelectromechanical acoustic pressure-generating device 200A (without sidewalls extending the in x-z-plane) into the x-z pane. Due to the interior structure of the devices in FIGS. 8A and 8C, the cross section may be a cross section at the line C as shown in FIGS. 8A and 8C.

The microelectromechanical acoustic pressure-generating device 200A is implemented as a MEMS. In some example implementations, the microelectromechanical acoustic pressure-generating device 200A may comprise a layer system in which several layers are stacked in the z-direction. The layer system comprises or consists of a plurality of layers, which may form a cover layer 202, an actuator layer 204 and a base layer 206, which are stacked on one another in the z-direction. Each of the cover layer 202, the actuator layer 204 and the base layer 206 may extend substantially in the x-y plane (i.e. the x-direction and y-direction). Each of the cover layer 202, an actuator layer 204 and a base layer 206 may be formed by one or more individual layers, e.g. several films that may have different thicknesses (e.g., EPyC-silicon films). Cover layer 202 and base layer 206 may form a planar cover and a planar base.

In the exemplary embodiments shown in FIG. 2A, the cover layer 202 of the microelectromechanical acoustic pressure-generating device 200A comprises a plurality of actuator drive portions 210, which may be used for driving the actuators 230. As will be explained in more detail in connection with FIGS. 5A and 5B below, each of the actuator drive portions 210 is provided with a pair of electrode arrangements and has a cutout region in which an end structure of an actuator 230 is accommodated. The cover layer 202 further comprises several air outlet openings 220 through which acoustic pressure produced by the movement of the actuators 230 in the x-y plane within cavity 250 can leave the microelectromechanical acoustic pressure-generating device 200A. The base layer 206 has several air inlet openings 240 through which air may enter the cavity 250 from the outside of the microelectromechanical acoustic pressure-generating device 200A. The cover layer 202, the base layer 206 and the sidewalls 204 may enclose the cavity 250 in which the actuators 230 are provided. The enclosed cavity 250 may be of an overall cuboid shape.

Figure 2B:
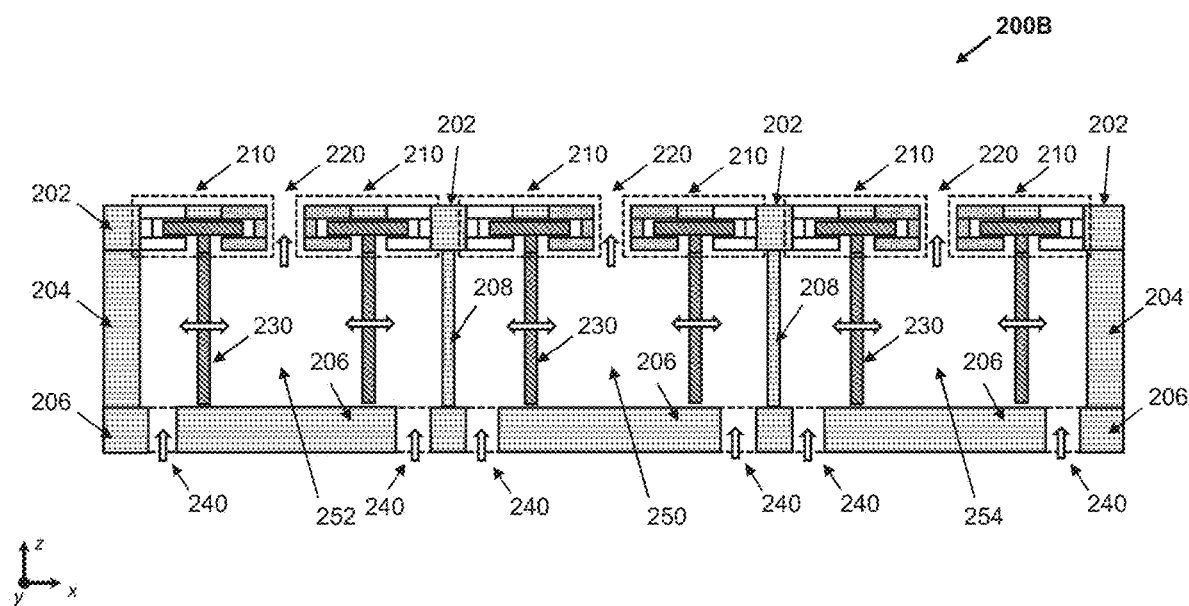
FIG. 2B shows a cross section of another microelectromechanical acoustic pressure-generating device in accordance with an exemplary embodiment of the invention.

FIG. 2B shows a cross section of another microelectromechanical acoustic pressure-generating device 200B in accordance with an exemplary embodiment of the invention. Also this cross section is a (common) cross section in the x-z plane. The microelectromechanical acoustic pressure-generating device 200B is similar to the microelectromechanical acoustic pressure-generating device 200A in FIG. 2A, except for the microelectromechanical acoustic pressure-generating device 200B comprising a plurality of cavities 250, 252, 254, which are separated by (inner) sidewalls 208. Plural actuators 230 are provided in each of the cavities 250, 252, 254. Each of the cavities 250, 252, 254 has at least one associated air inlet opening 240 in the base layer 206 and at least one air outlet openings 220 in the cover layer 202. In general, when having multiple cavities 250, 252, 254 the actuators 230 may all move in the x-y plane, but they may or may not be all arranged in parallel to each other in the x-direction (i.e. they extend substantially in y-z plane) as shown in FIG. 2B or in the y-direction (i.e. they extend substantially in the x-z plane). Alternatively, the arrangement direction may be selected for each cavity 250, 252, 254 among those two options. Further, cavities 250, 252, 254 in FIG. 2B are formed adjacent to each other in the x-direction. In some embodiments, cavities may be formed in the x-direction and y-direction, so that the microelectromechanical acoustic pressure-generating device has an array of cavities.

The base layer 206 in FIGS. 2A and 2B may not have any actuator drive portions 210, but this is only an example. In principle, the actuator drive portions 210 may also be provided in the base layer 206 instead of the cover layer 202 (in this case, the microelectromechanical acoustic pressure-generating device 200A could be flipped around in the x-direction, so that the base layer 206 becomes the cover layer 202 and vice versa, and the air inlet openings 240 become the air outlet openings 220 and vice versa). In case of the microelectromechanical acoustic pressure-generating device having multiple cavities 250, 252, 254 in x-direction (and/or y-direction), the actuator drive portions 210's location in the cover layer 202 or the base layer 206 could be selected on a per cavity basis.

In other example implementations, the actuator drive portions 210 associated to the actuators 230 in a given cavity can be also alternatingly located in the cover layer 202 or the base layer 206, so that either every adjacent two actuators 230 have their actuator drive portions 210 in the cover layer 202 and the base layer 206, or every adjacent two pairs of actuators 230 have their actuator drive portions 210 in the cover layer 202 and the base layer 206. In this latter case the actuator drive portions 210 for each pair of actuators 230 are formed jointly in either the cover layer 202 or the base layer 206 (e.g. the pair of leftmost actuator drive portions 210 neighboring the leftmost air outlet opening 220 and the pair of rightmost actuator drive portions 210 neighboring the rightmost air outlet opening 220 in FIGS. 2A and 2B could be formed in the cover layer 202, whereas the pair of actuator drive portions 210 neighboring the middle air outlet opening 202 could be formed in the base layer 206, or vice versa). The arrangement of the actuator drive portions 210 in the cover layer 202 and the base layer 206 may be for example useful to further reduce the size/dimension of the microelectromechanical acoustic pressure-generating device in the x-direction.

In operation, two directly adjacent actuator drive portions 210, i.e. pair of adjacent actuator drive portions 210, of the in the microelectromechanical acoustic pressure-generating devices 206A, 200B can drive their associated actuators 230 in mutually opposite directions (in the x-direction) so that air between the associated actuators 230 in the associated cavity 250, 252, 254 is compressed (or expanded) by the movement of the two actuators 230 and expelled from (or enters into) the space of the associated cavity 250, 252, 254 in between the two actuators 230 through at least one air outlet opening 220 provided (in x-direction) between the two the two actuators 230 in the cover layer 202 and (fluidly) connected to the associated cavity 250, 252, 254.

Figure 3:
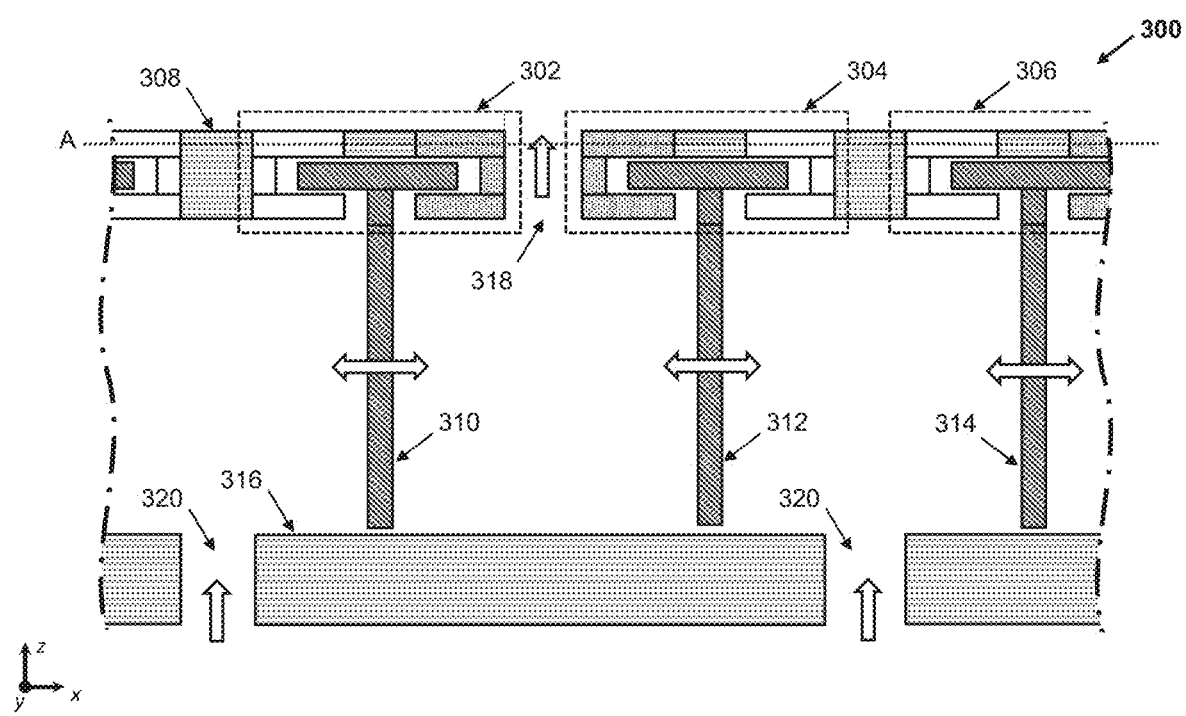
FIG. 3 shows a cross section of a portion of a microelectromechanical acoustic pressure-generating device in accordance with an exemplary embodiment of the invention.

FIG. 3 shows a more detailed cross section of a portion of a microelectromechanical acoustic pressure-generating device in FIG. 2A in accordance with an exemplary embodiment of the invention. In this implementation example, the cover layer 202 is shown as the cover layer 308 having a same thickness in the z-direction as the adjacent actuator drive portions 302, 304, 306, which correspond to neighboring actuator drive portions 210 of FIG. 2A. As can be better seen in FIG. 3, the pair of adjacent actuator drive portions 302, 304 has an air outlet opening 318 arranged in between them (in x-direction). Actuator drive portion 302 is configured for driving the actuators 310 and actuator drive portion 304 is configured for driving the actuators 312, so that the actuators 310, 312 move in opposite directions, i.e. they jointly move towards the air outlet opening 318 or away from the air outlet opening 318. As will be explained in more detail in connection with FIGS. 5A and 5B below, each of the actuator drive portions 302, 304 is provided with a pair of electrode arrangements that are indicated by the differently hatched approximately U-shaped portions. Note that the same hatching of the individual electrode arrangements is intended to yield that the electrode arrangements of actuator drive portions 302, 304, 306 having the hatching should be driven by the same drive signal to drive the associated actuators 310, 312, 314.

Figure 4:
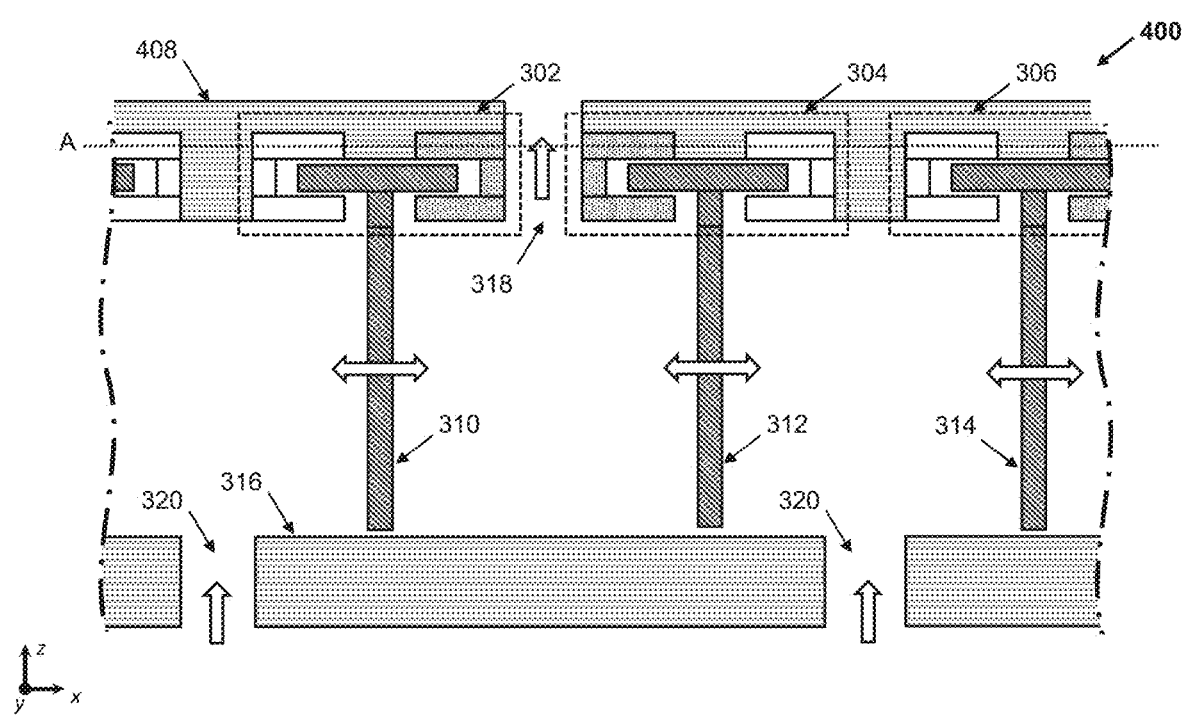
FIG. 4 shows another cross section of a portion of a microelectromechanical acoustic pressure-generating device in accordance with an exemplary embodiment of the invention.

FIG. 4 shows another cross section of a portion of a microelectromechanical acoustic pressure-generating device of FIG. 2A in accordance with an exemplary embodiment of the invention. The embodiment of FIG. 4 is substantially identical to that in FIG. 3 except for the actuator drive portions 302, 304, 306 are thinner in z-direction. Actuator drive portions 302, 304, 306 may be considered provided within the cover layer 408 in blind hole-like recesses within the cover layer 408.

Figure 5A:
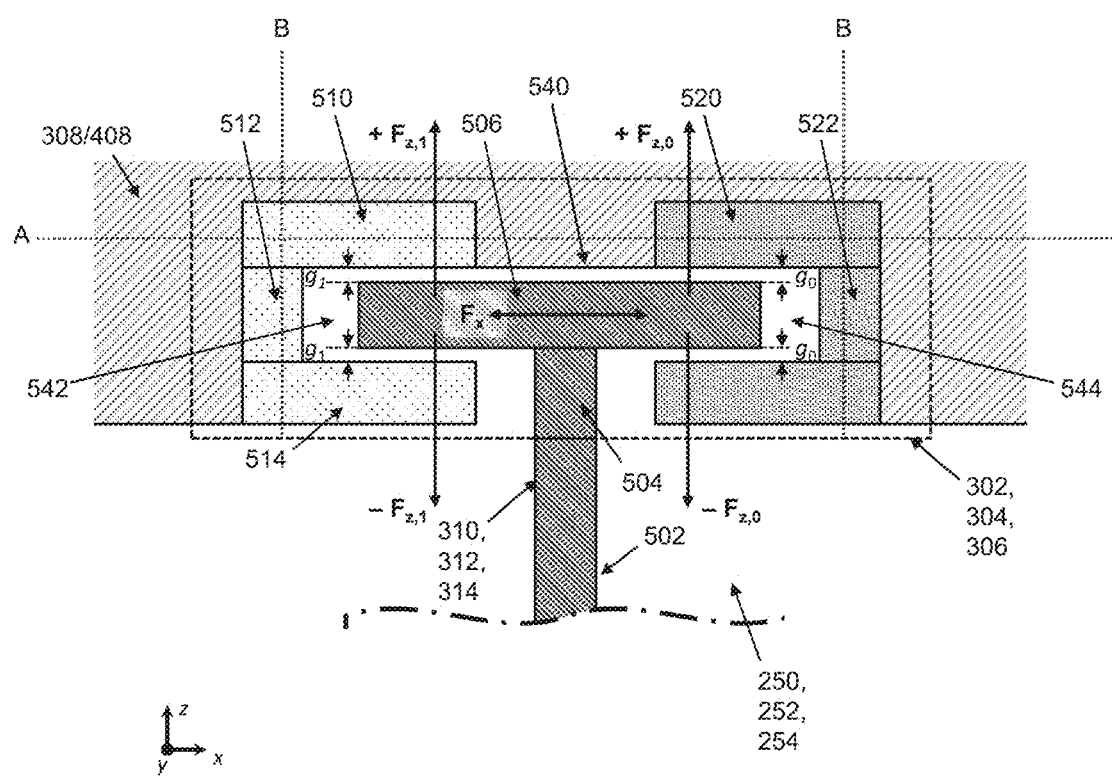
FIGS. 5A & 5B show a cross section of an actuator drive portion of a microelectromechanical acoustic pressure-generating device in accordance with an exemplary embodiment of the invention.
Figure 5B:
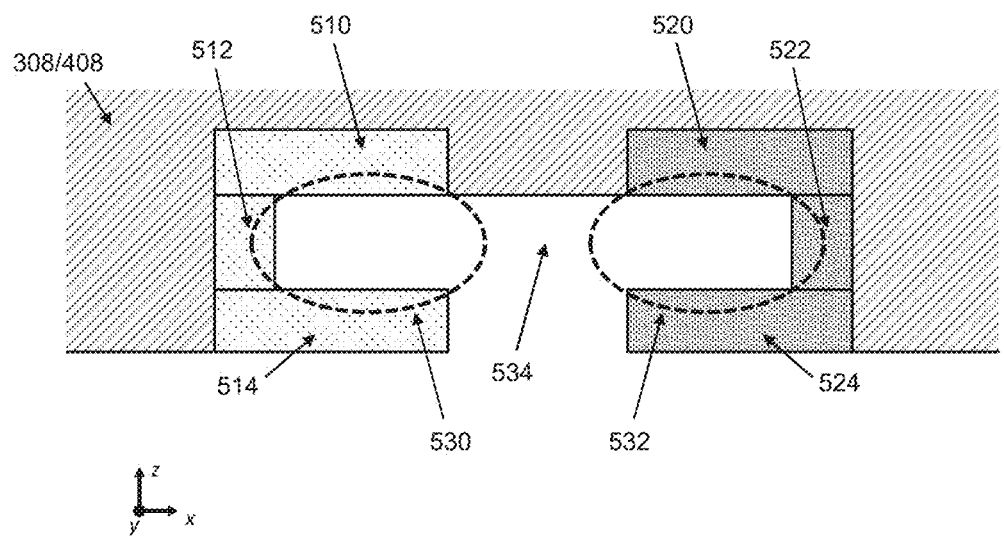

FIGS. 5A and 5B show a cross section of an exemplary actuator drive portion, e.g. actuator drive portion 210, 302, of a microelectromechanical acoustic pressure-generating device as described in connection with any of FIGS. 2A, 2B, 3 and 4 above. In this implementation example, one end of the actuators (e.g. actuator 310, 312, 314 of FIG. 3 or 4 or an actuator 230 of FIG. 2A or 2B) extends into a cutout region 534 provided in cover layer 308, 408 of the microelectromechanical acoustic pressure-generating device. The actuator 310, 312, 314 may be provided with a structure that extends (substantially) in parallel with plane of the cover layer 308, 408 in the cutout region 534. This structure is shown as a leg 506, which is connected to a fin 502 of actuator 310, 312, 314 through a connecting structure 504 at one or more connection points. The leg finger 506 may be planar and extends (substantially) in the x-direction and the y-direction. The leg 506 may also form a plane finger. The fin 502 may be planar (second) leg extending (substantially) in the y-direction and the z-direction into the cavity 250, 252, 254 of the microelectromechanical acoustic pressure-generating device. In the shown example, the leg 506 and the fin 502 form a common T-shaped cross section in the x-z plane.

Notably, the connection between the leg 506 and the fin 502 of the actuator 310, 312, 314 may be stiff interconnection 504 so that the lateral movement (in x-direction) of the leg 506 causes a corresponding movement of the fin 502 within grooves 530, 532 of the cutout region 534. The interconnection between the leg 506 and the fin 502 of the actuator 310, 312, 314 may include one or more connection points 504, which may be provided along the leg 506's and/or fin 502's extent in the y-direction. The cutout region 534 may form a part of the actuator drive portion 302, 304, 306 in the cover layer 308, 408. In another example, a single coupling point 504 can also extend along the entire length of the leg 506. In another example, the leg 506 can extend along the entire length (in y-direction) of the fin 502 and even beyond, i.e. the leg 506 may be even longer than the fin 502 in the y-direction (see for example FIG. 8A). The connection between the leg 506 and the fin 502 may be electrically conducting, so that an electric potential can be applied (and changed) to the leg 506 of the actuator 310, 312, 314, e.g. through one end of the fin 502. Alternatively, an electric potential could be applied (and changed) to the leg 506 of the actuator 310, 312, 314, and the leg 506 may be electrically isolated from the fin 502 by means of the interconnection. In this latter case the fin 502 may be formed from a non-conductive material, e.g. SiO$_2$ or another isolating semiconductor material.

As noted, a (controllable) potential may be for example applied to the leg 506 through the fin 502. In this case, the fin 502 would be made of an electrically conducting material, e.g. silicon. One end or both ends of the fin 502 may be fixed to one of the sidewalls (e.g. one of sidewalls 204), and the (controllable) potential may be applied to the fin 502 at (at least one of) the coupling point(s) so as to provide the potential to the leg 506 from the exterior of the microelectromechanical acoustic pressure-generating device (e.g. a processing unit 1102 of the microelectromechanical loudspeaker system 1100). Alternatively, the fin 502 could also be electrically isolated from the leg 506 (e.g. the through an isolating interconnection 504) or the fin 502 may be made of some insulating material. In this alternative implementation, the electric contacting of the leg 506 could be realized in the y-direction, e.g. by means of some conductive spring(s) in the x-y plane.

Each actuator drive portion 302, 304, 306 can be provided with a pair of electrode arrangements (510, 512 and 514; and 520, 522 and 524, respectively). The electrode arrangements each have multiple electrode portions 510, 514; 520, 524. Those electrode portions 510, 514; 520, 524 extend (substantially) in parallel with x-y plane of cover layer 308, 408. In a non-limiting example implementation, the distance between the electrode portion 510, 520 and the electrode portion 514, 524 in the z-direction may be in the range inclusive 50 nm and inclusive 5.0 µm, preferably in the range inclusive 500 nm and inclusive 4.0 µm, and further preferably in the range inclusive 1.0 µm and inclusive 3.0 µm. The electrode portions 510, 514; 520, 524 of the pair of electrode arrangements are provided in the associated cutout region 534. The electrode portions 510, 514; 520, 524 define at least a portion of the cutout region 534. The electrode portions 510, 514 or 520, 524 of a given electrode arrangement are arranged in parallel. The electrode portions 510 and 514 jointly form an electrode of the actuator drive portion 302, 304, 306. The electrode portions 520 and 524 jointly form another electrode of the same actuator drive portion 302, 304, 306. For this, the electrode portions 510 and 514, and 520 and 524 of a given electrode arrangement may be (electrically) interconnected 512, 522 with each other in the device structure, which is however not mandatory.

In the example shown in FIGS. 5A and 5B, the electrode portions 510 and 514 are interconnected by a connecting portion 512, and the electrode portions 520 and 524 are interconnected the connecting portion 522. Electrode portions 510 and 514 interconnected by the connecting portion 512 and the electrode portions 520 and 524 interconnected the connecting portion 522 form (substantially) a U-shaped common cross sections ("common" means the cross section when projecting the electrode portions and connection portions into the x-z plane) which are facing each other so that the cutout region 534 of the actuation drive portion 302, 304, 306 which connects to the cavity 250, 252, 254 is provided. The electrode portions 510, 514 are electrically isolated from the electrode portions 520, 524. In the example shown, isolating material of the cover layer 308, 408 is formed in between the electrode portions 510 and 520. The bottom surfaces electrode portions 510, 520 of the pair of electrode arrangements of the actuator drive portion 302, 304, 306 that face the cavity 250, 252, 254 form part of a wall 540 extending in the x-y plane and limit the cutout region 534 of the given actuator drive portion 302, 304, 306, wherein the remaining portion of the wall 540 is formed by some isolating material as noted above.

The electrode portions 510, 514; 520, 524 of a given electrode arrangement partially overlap with the leg 506 at the fin 502 of an actuator 310, 312, 314 reaching into grooves 530, 532 of the cutout region 534, so that gaps (indicated by the distances $g_0$ and $g_1$) are provided in z-direction between the upper and lower surfaces (in the x-y-plane) of the leg 506 and the surfaces (in the x-y-plane) of the individual electrode portions 510, 514 and 520, 524 that delimit the cutout region 534. The gaps between the respective electrode portions 510, 514 and 520, 524 and the one end of the leg 506 may be identical, as indicated by the same distances $g_0$ and $g_1$. In one example implementation, all gap sizes are identical, i.e. distances $g_0=g_1$. In a non-limiting example implementation, the gap sizes $g_0$ and $g_1$ may be in the range inclusive 100 nm and inclusive 1.0 µm, preferably in the range inclusive 200 nm and inclusive 600 nm, and further preferably in the range inclusive 250 nm and inclusive 400 nm. Due to having identical gap sizes $g_0$ and $g_1$, the pull-in effect can be minimized or eliminated, when driving the actuator 310, 312, 314. This is because the different driving potentials between the electrode portions 510, 514 and 520, 524 and the actuator 310, 312, 314 will cause two opposing forces $+F_{z,1}$ and $-F_{z,1}$, respectively, $+F_{z,0}$ and $-F_{z,0}$ acting on the leg 506, which (substantially) cancel each other ($+F_{z,1}-F_{z,1}\approx0$ and $+F_{z,0}-F_{z,0}\approx0$, ideally=0).

Moreover, spaces 542, 544 are provided in the grooves 530, 532 between the end surfaces (in the y-z plane) of the leg 506 and the respective surfaces of the connection portions 512, 522 (or a corresponding wall structure of the cover layer 308, 408, if the connection portions 512, 522 are not present or not continuous in the y-direction, see for example FIGS. 6A-6D below). In one example embodiment, the two electrode arrangement 510, 512, 514 and 520, 520, 522 of an actuator drive portion 302, 304, 306 can be driven by the two electrodes at potential levels $+V_{dc}$ and $-V_{dc}$. The two electrodes 510, 512, 514 and 520, 522, 522 at the potential levels $+V_{dc}$ and $-V_{dc}$, respectively, generate an electrostatic field or a field gradient of an electric potential field in which signal changes of the actuator's potential ($V_{ac}$) (or the leg 506's potential, if the fin 502 is isolated from the leg 506), lead to an induced force $F_x$ in the x-direction (see FIG. 5A). Assuming equal gap sizes, i.e. $g_0=g_1$, the force $F_x$ on the leg 506 can be approximated as follows:

$$F_x = \frac{1}{2}\frac{\partial C}{\partial x} \cdot 4V_{dc} \cdot V_{ac}\frac{\partial C}{\partial x} = 2 \cdot \varepsilon_r \varepsilon_0 \cdot \frac{L_{leg}}{g_0} \text{ with}$$

$$\frac{\partial C}{\partial x} = 2 \cdot \varepsilon_r \varepsilon_0 \cdot \frac{L_{leg}}{g_0}$$

Here $L_{leg}$ is the length of the leg 506 in z-direction, which may (but need not) differ from the fin length $L_{fin}$ of the fin 502. The driving force $F_x$ can therefore assume large values with comparable small gap dimensions $g_0$ and $g_1$. However, it can also reach larger values with $L_{leg}>L_{fin}$. Driving force $F_x$ thus leads to a lateral deflection of the fins 502 and thus to a modulation of the air volume between the fins 502.

When driving the actuator 310, 312, 314, a driving force $F_x$ moves the actuator 310, 312, 314 and thus the leg 506 within the grooves 530, 532 of cutout region 534. When moving to the left in FIG. 5A, the movement of the leg 506 causes the air in the space 542 to be compressed, which may result in a desirable damping of the movement of the leg 506 and thus the actuator 310, 312, 314 at the turning point where the leg 506 is caused to move in the other direction towards the electrode arrangement 520, 522, 524. The level of damping (and controlled thereof) will depend on the gap sizes $g_0$ and $g_1$ and the viscosity of the air. When the gap sizes $g_0$ and $g_1$ are small, there will be hardly any fluid connection between the air in spaces 542, 544 and the cavity 250, 252, 254 which will promote the damping effect when driving the actuators 310, 312, 314.

Figure 1A:
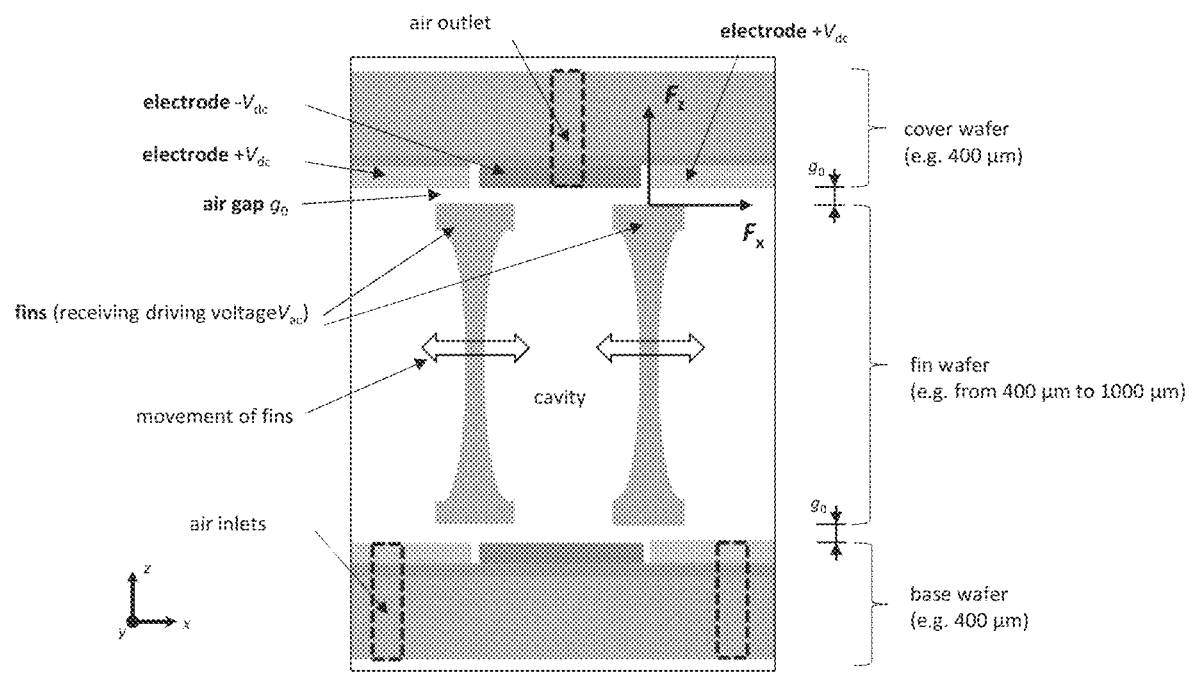
FIG. 1A shows a cross-section of the micromechanical device described in WO 2022/11717 A1 (application no. PCT/EP2020/084506)
Figure 1B:
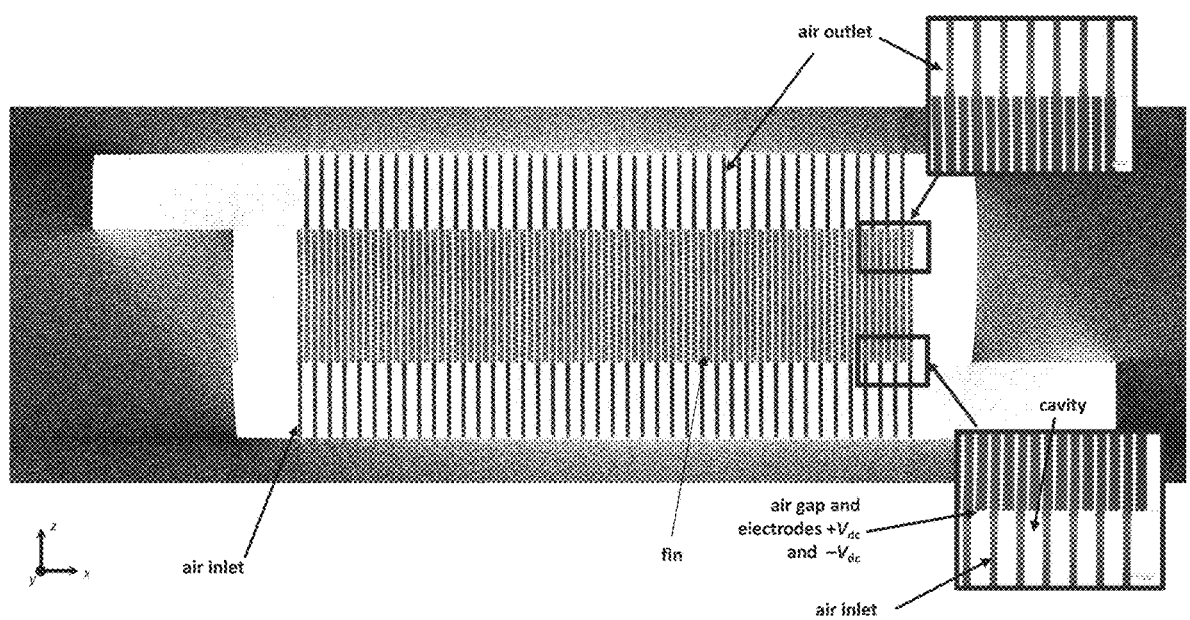
FIG. 1B shows a real implementation of a cross-section of the micromechanical device described in WO 2022/11717 A1 (application no. PCT/EP2020/084506)

In summary, design example discussed in connection with FIGS. 2A, 2B, 3, 4, 5A and 5B above, may provide for the following advantages. The portion of the actuators 230, 310, 312, 314 that can be driven by the actuators drive portions 210, 302, 304, 306 has a substantially larger extent in the x-direction due to the leg 506 that is substantially wider in x-direction than the fin 502. This means that the width of the fin 502 no longer limits the maximum possible deflection. Crossovers electromechanical overdrive do no longer occur. This further facilitates designs with reduced THD, e.g. in comparison to the devices in FIGS. 1A and 1B.

As regards the lateral misalignment (in x-direction) that results from wafer bonding, the fin 502 is connected to the leg 506 via the coupling point 504. When using lithographic processes to realize this interconnection, the lateral accuracy of this connection results from lithographic resolution of the manufacturing process, which may be substantially more accurate than the lateral alignment tolerance during wafer bonding. Furthermore, as regards the z-stiffness of the overall actuator structure, the exemplary T-profile of the actuator provides higher bending stiffness in the z-direction. As explained above, the use of the T-profile for the end structure of the actuator in combination with the actuator drive portion design allows to substantially reduce or even avoid pull-in instabilities due to the balancing of the pull-in forces in z-direction ($+F_{z,0}-F_{z,0}\approx 0$ and $+F_{z,1}-F_{z,1}\approx 0$). Moreover, the proposed designs allow to increase the electrostatic driving force $F_x$ that controls the deflection of the actuators in the x-direction. The legs 506 can be designed longer than the fins 502. Thus, a higher electrostatic drive force $F_x$ can be available for the deflection of the fins 502. This allows designing microelectromechanical acoustic pressure-generating devices with higher Sound Pressure Level (SPL) and/or less THD.

Figure 6A:
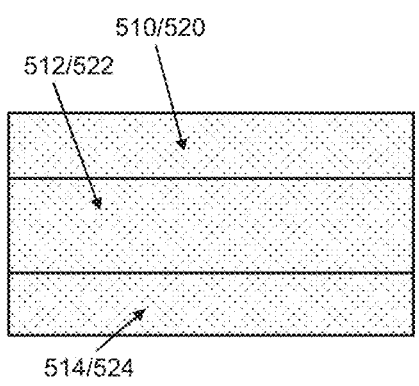
Figure 6A:

FIGS. 6A to 6D show different cross sections in the x-y plane of an electrode arrangement 510, 512, 514; 520, 522, 524 of an actuator drive portion 302, 304, 306 shown in FIGS. 5A and 5B in accordance with different exemplary embodiments of the invention. The cross section may be a cross section along one of lines B in FIG. 5A. The two electrode portions 510, 514; 520, 524 of a given electrode arrangement are (electrically) connected to each other via one or more connecting portions 512, 522. As shown in FIG. 6A, there may be one connecting portion 512, 522 that may have the same length (in y-direction) as the electrode portions 510, 512; 520, 522.

Figure 6B:
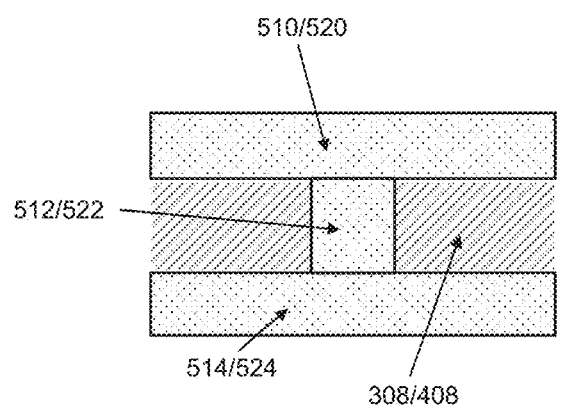
Figure 6B:

In another example implementation shown in FIG. 6B, a single connecting portion 512, 522 that is substantially shorter than the length (in y-direction) as the electrode portions 510, 512; 520, 522 may be used to provide the electric interconnection. For example, the single connecting portion 512, 522 in FIG. 6B may be formed by means of a via in between the sub-layers of the electrode portions 510, 520 and the of the electrode portions 512, 522. The connecting portion 512, 522 can be, but does not have to be centered (in y-direction). In the example implementation in FIG. 6C, the single connecting portion 512, 522 is provided at one end of the electrode portions 510, 512; 520, 522. Furthermore, as shown in the example of FIG. 6D, multiple connecting portions 512, 522 can be provided along the extent of the electrode portions 510, 512; 520, 522 in the y-direction.

In the example implementation in FIGS. 5A and 5B, the electrodes and connecting portions 510, 512, 514; 520, 522, 524 of the pair of electrode arrangements in the actuator drive portion 302, 304, 306 form a U-like shaped common cross section. However, according to further embodiments, the common cross section of the electrodes and connecting portions 510, 512; 520, 520, 522, 524 of the pair of electrode arrangements in the x-z-plane may also form an E-shape or a comb-shape. The structures provided the corresponding ends of the actuators 310, 312, 314 may have corresponding shapes that match with the shape of associated pair of electrode arrangements so that those structures reach into a grooves provided in between the electrode portions of the associated pair of electrode arrangements (for example, if the associated pair(s) of electrode arrangements have an E-shaped cross section, the structure(s) at the one or both ends of the actuator may have a U-shaped cross sections so that the legs of the U-shaped structure can protrude in in between the legs of the E-shaped electrode arrangements).

Figure 7A:
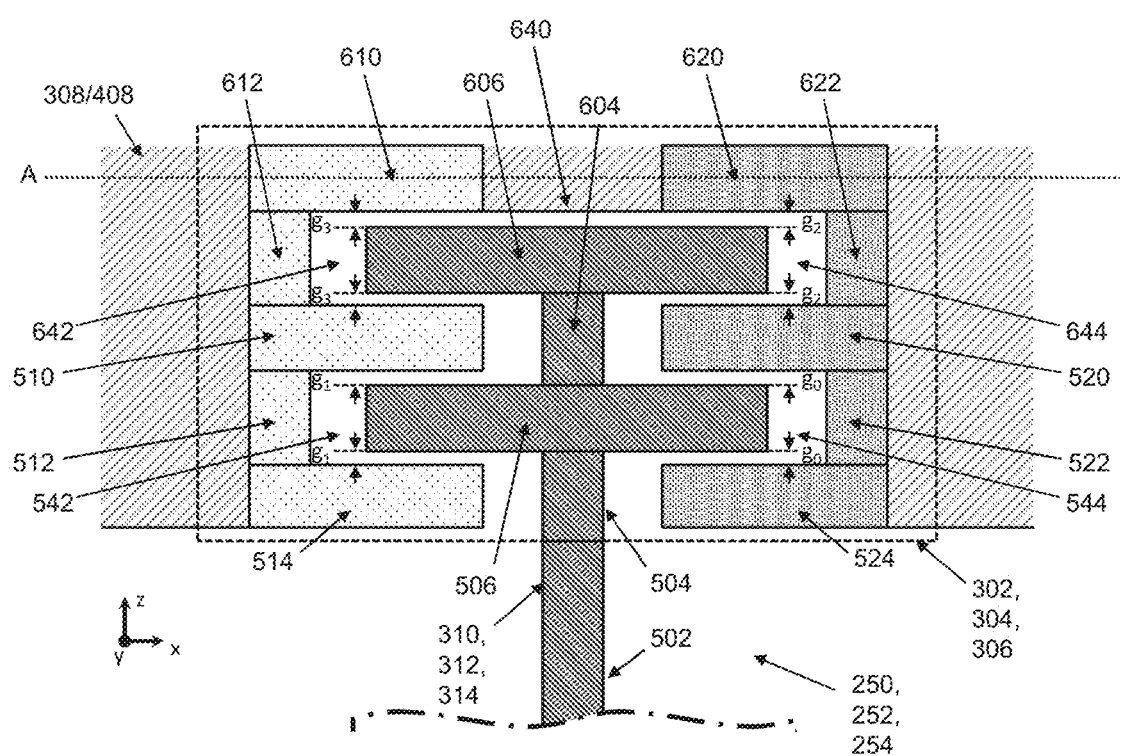
FIGS. 7A & 7B show a cross section of another actuator drive portion of a microelectromechanical acoustic pressure-generating device in accordance with an exemplary embodiment of the invention.
Figure 7B:
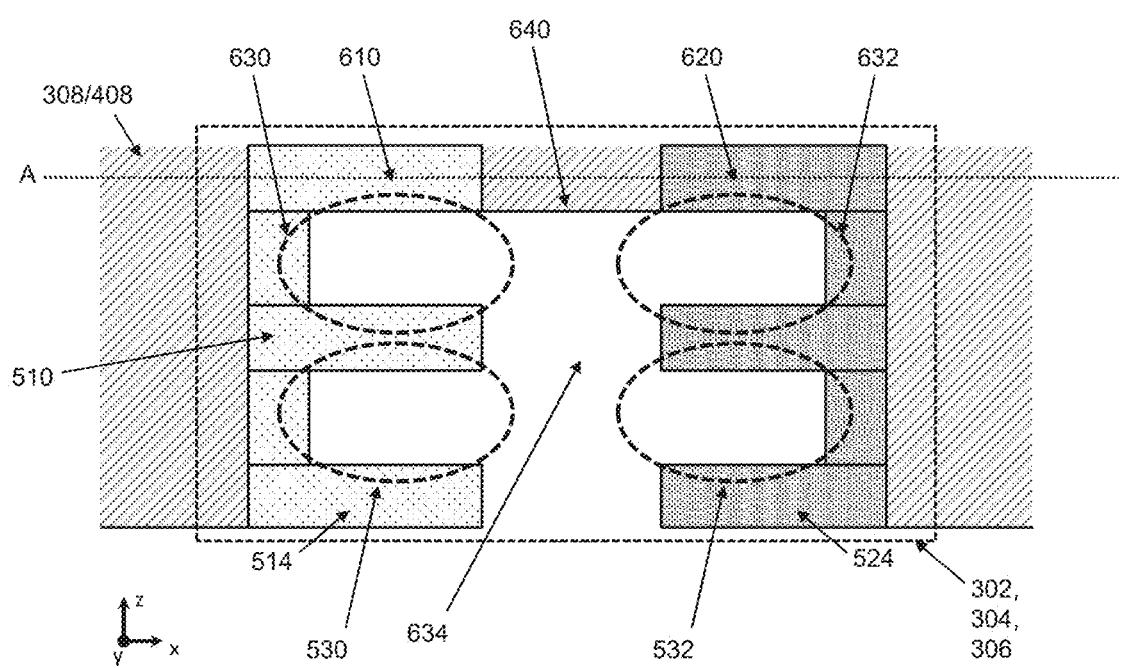

FIGS. 7A and 7B show a cross section of another actuator drive portion 302, 304, 306 of a microelectromechanical acoustic pressure-generating device in accordance with an exemplary embodiment of the invention, where the common cross section of the electrode arrangements is an E-shape. In comparison to the common cross section of the electrode arrangements shown in FIGS. 5A and 5B, another electrode portion 610, 620 and connecting portions 612, 622 are added to the electrodes and connecting portions 510, 512, 514; 520, 522, 524, so as to form the E-shaped cross section. The connecting portions 612, 622 provide an electric connection between the electrode portions 610, 620 and the other electrode portions 510, 514; 520, 524 of the respective electrode arrangements. Like in FIGS. 5A and 5B, the structure at the end of the actuators 310, 312, 314 has another leg 606 extending (substantially) in the x-y-plane and which protrudes into the grooves 630, 632 formed in between the electrode portions 610, 510 and the connecting portion 612 and the electrode portions 620, 520 and the connecting portion 622, respectively. The leg 606 is connected to the leg 506 through a connecting structure 604 at one or more connecting points. The connecting structure 604 may be similar to the connecting structure 504 discussed herein above (see FIGS. 6A-6D). The two legs 506, 606 and the connecting structure 604 provided at the end of the actuator 310, 312, 314 as a substantially H-like common cross section in the x-z-plane which matches the E-like common cross section of the corresponding electrode arrangements provided in the actuator drive portion 302, 304, 306.

The electrode portions 510, 514; 520, 514 of a given electrode arrangement partially overlap with the leg 506 at the end of the actuator 310, 312, 314 reaching into grooves 530, 532 of the cutout region 634, so that gaps (indicated by the distances $g_1$ and $g_0$) are provided in z-direction between the upper and lower surfaces (in the x-y-plane) of the leg 506 and the surfaces (in the x-y-plane) of the individual electrode portions 510, 514 and 520, 514 that delimit the cutout region 634. The electrode portions 610, 510; 620, 520 of a given electrode arrangement partially overlap with the leg 606 at the end of the actuator 310, 312, 314 reaching into additional grooves 630, 632 of the cutout region 634, so that gaps (indicated by the distances $g_3$ and $g_2$) are provided in z-direction between the upper and lower surfaces (in the x-y-plane) of the leg 606 and the surfaces (in the x-y-plane) of the individual electrode portions 610, 510 and 620, 520 that delimit the cutout region 634. The bottom surfaces electrode portions 610, 620 of the pair of electrode arrangements of the actuator drive portion 302, 304, 306 that face the cavity 250, 252, 254 form part of a wall 640 extending in the x-y plane and limit the cutout region 634 of the given actuator drive portion 302, 304, 306, wherein the remaining portion of the wall 640 is formed by some isolating material of the cover layer 308/408.

The gaps between the respective electrode portions 510, 514 and 520, 524 and the one end of the leg 506 may be identical, as indicated by the same distances $g_0$ and $g_1$. The gaps between the respective electrode portions 610, 510 and 620, 520 and the one end of the leg 606 may be identical, as indicated by the same distances $g_3$ and $g_2$. In one example implementation, all gap sizes are identical, i.e. distances $g_0 = g_1$ and $g_2 = g_3$. In one example implementation, $g_0 = g_1 = g_2 = g_3$. In a non-limiting example implementation, the gap sizes $g_0$, $g_1$, $g_2$ and $g_3$ may be in the range inclusive 100 nm and inclusive 1.0 μm, preferably in the range inclusive 200 nm and inclusive 600 nm, and further preferably in the range inclusive 250 nm and inclusive 400 nm. Due to having identical gap sizes $g_0$ and $g_1$, and identical gap sizes $g_2$ and $g_3$ the pull-in effect can be minimized or eliminated, when driving the actuator 310, 312, 314. This is because the different driving potentials between the electrode portions 610, 510, 514 and 620, 520, 524 and the actuator 310, 312, 314 will cause two opposing forces acting on the legs 506 and 606, which (substantially) cancel each other.

When driving the actuator 310, 312, 314, the driving force $F_x$ moves the actuator 310, 312, 314 and thus the legs 506 and 606 within the grooves 530, 532, 630, 632 of cutout region 634. When moving to the left in FIG. 7A, the movement of the legs 506 and 606 causes the air in the spaces 542, 642 to be compressed, which may result in a desirable damping of the movement of the legs 506 and 606 and thus the actuator 310, 312, 314 at the turning point where the legs 506 and 606 are caused to move in the other direction towards the electrode arrangement 620, 622, 520, 522, 524. The level of damping (and controlled thereof) will depend on gap sizes $g_0$, $g_1$, $g_2$ and $g_3$ and the viscosity of the air. When the gap sizes $g_0$ and $g_1$ are small, there will be hardly any fluid connection between the air in spaces 542, 544 and the cavity 250, 252, 254 which will promote the damping effect when driving the actuators 310, 312, 314.

In one example embodiment, the two electrode arrangement 610, 612, 510, 512, 514 and 620, 622, 520, 520, 522 of an actuator drive portion 302, 304, 306 can be driven by the two electrodes 610, 612, 510, 512, 514 and 620, 622, 520, 520, 522 at potentials $+V_{dc}$ and $-V_{dc}$. The two electrodes at potentials $+V_{dc}$ and $-V_{dc}$, respectively, generate an electrostatic fields or a field gradients of an electric potential field in which signal changes of the actuator's potential ($V_{ac}$) (or the legs 606 and 506's potential, if the fin 502 is isolated from the legs 506 and 606), lead to an increase of the driving force $F_x$ in the x-direction, as an individual driving force component is induced on each of legs 506 and 606. Furthermore, in examples of FIGS. 5A and 7A, it may be advantageous to increase the thickness of the connecting portions 512, 612, 522, 622 in the z-direction and the corresponding thickness of the legs 506, 606 in the z-direction to further increase the driving force $F_x$ that moves the actuator 310, 312, 314. However, this may come at the downside of an increased thickness of the actuator drive portion 302, 304, 306, and are thus the overall size of the microelectromechanical acoustic pressure-generating device acoustic pressure-generating device.

It should be further noted that embodiments of the invention are not considered limited to stacking two or three electrode portions (e.g. 510, 514, 610) in a given electrode arrangement. In principle also more electrode portions could be stacked one on another in z-direction, depending on the required strength of the driving force $F_x$ in the x-direction. Similarly, additional legs and connecting portions may be added at the end of the actuators 310, 312, 314 to match the structure of the electrode arrangements in the manner described hereinabove. Stacking more electrode portions may however increase the overall thickness (in z-direction) of the microelectromechanical acoustic pressure-generating device.

Figure 8B:
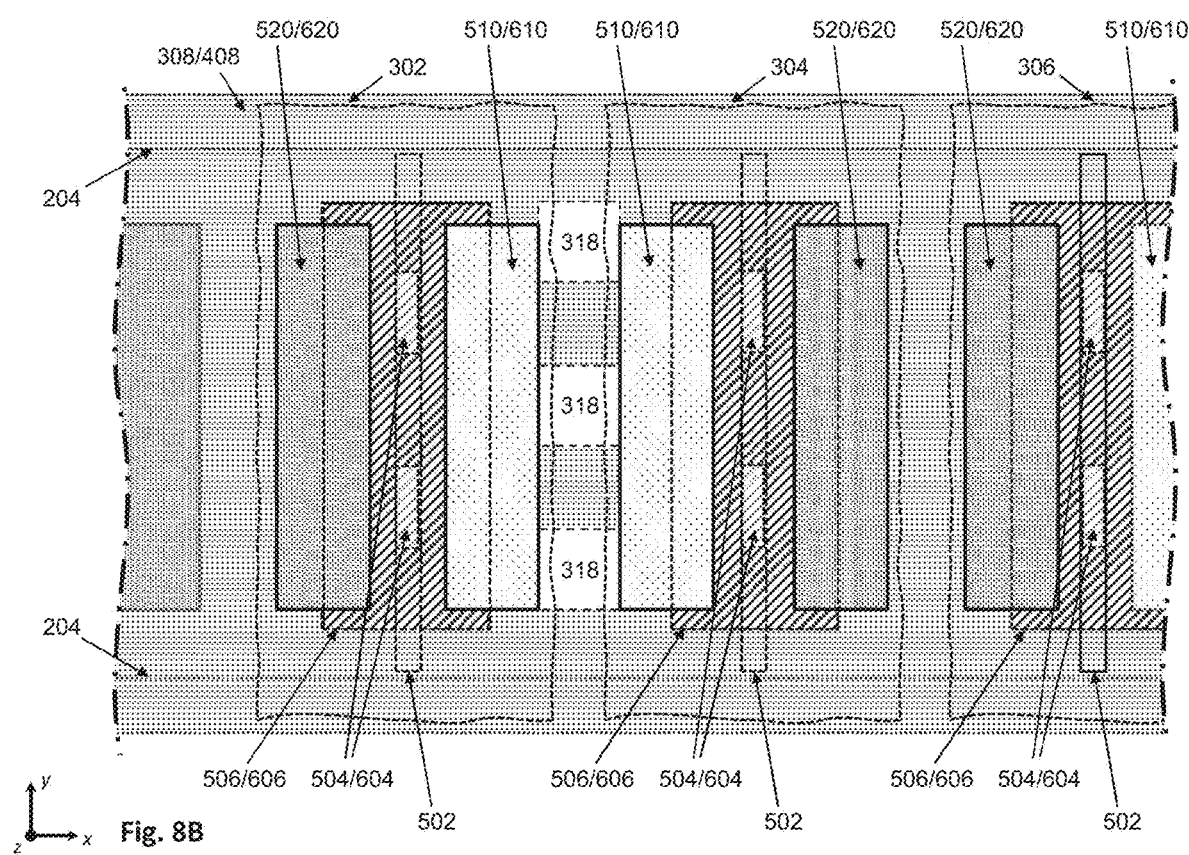

FIGS. 8A to 8C show different cross sections of the portion of the microelectromechanical acoustic pressure-generating device in FIGS. 3 and 4 in the in accordance with different exemplary embodiments of the invention. The details of the actuator drive portions 302, 304, 306 may be configured as shown, for example, in FIGS. 5A and 5B and FIGS. 7A and 7B. More specifically, FIGS. 8A to 8C may be considered a top view in z-direction on the cross sections in the x-y plane formed at line A in FIGS. 5A and 7A. As discussed above, one or more air outlet openings 318 may be provided in between adjacent pairs of actuator drive portions 302, 304, 306.

In the example embodiment of FIG. 8A, there are three air outlet openings 318 which are distributed on a line in the y-direction in between the two adjacent actuator drive portions 302, 304. In the top view, the upper (in z-direction) electrode portions 510/610 and 520/620 are shown to overlap (in x-direction) with the leg 506/606 of the actuators 310, 312, 314, so that the leg 506/606 of the actuators 310, 312, 314 protrudes into the grooves 530, 532/630, 632 of the pair of electrode arrangements formed on either side of the ends of the leg 506/606. In the example shown, the leg 506/606 of the actuator 310, 312, 314 is connected to the fin 502/leg 506 by means of a single connecting structure 504/604, which is provided approximately at the center of the leg 506/606 and the fin 502 in the y-direction. As illustrated by the different hatching of the electrode portions 510/610 or 520/620 of two neighboring actuator drive portions (e.g. 302 and 304) may have the same drive potential applied, $+V_{dc}$ or $-V_{dc}$, where the electrode portions 510/610 and 520/620 of a single actuator drive portion 302, 304, 306 receive the potentials $+V_{dc}$ or $-V_{dc}$, respectively. Furthermore, in the illustrated example of FIG. 8A, the electrode portions 510, 520, 610, 620 and the leg(s) 506, 606 are longer (in z-direction) than the fins 502 of the actuators 310, 312, 314.

In the further embodiment shown in FIG. 8B, the electrode portions 510, 520, 610, 620 and the leg(s) 506, 606 are shorter (in z-direction) than the fins 502 of the actuators 310, 312, 314. Furthermore, to connecting the structures 504/604 are shown for interconnecting the leg 506/606 of the actuator 310, 312, 314 and the fin 502/leg 506. Again, this is only exemplary.

In the further embodiment of FIG. 8C, the electrode portions 510, 520, 610, 620 and the leg(s) 506, 606 are separated into two sub-sets in the y-direction. Each fin 502 may be connected via connecting portions 504/604 to two sub-sets of electrode portions 510, 520, 610, 620 and the legs 506, 606. More than two subsets may be formed in the y-direction as desired.

It is noted that the invention is not limited to the examples shown in FIGS. 8A to 8C. Those skilled in the art understand that the actuator drive portion 210, 302, 304, 306 may be varied with respect to the length of the electrode portions 510, 514, 610, 520, 524, 620 (in y-direction) and their width (in x-direction) and their height (in z-direction), the number of stacked electrode portions in the electrode arrangements, the number of electrode arrangements and their positioning in y-direction in each of actuator drive portion 210, 302, 304, 306, the size and number of air outlet openings 318 or air inlet openings 320 associated with each neighboring pair of actuator drive portions 210 (e.g. 302 and 304), the length of the fins 502 (in z-direction) and their relative length in comparison to the length of the electrode portions 510, 514, 610, 520, 524, 620, etc. Further, the air outlet and/or air inlet openings may have a cross-section different from shown quadrangular shape—For example, the openings may be circular, oval, or may have a stepped outline, but the invention is not considered to be limited to these explicitly noted shapes.

Figure 9:
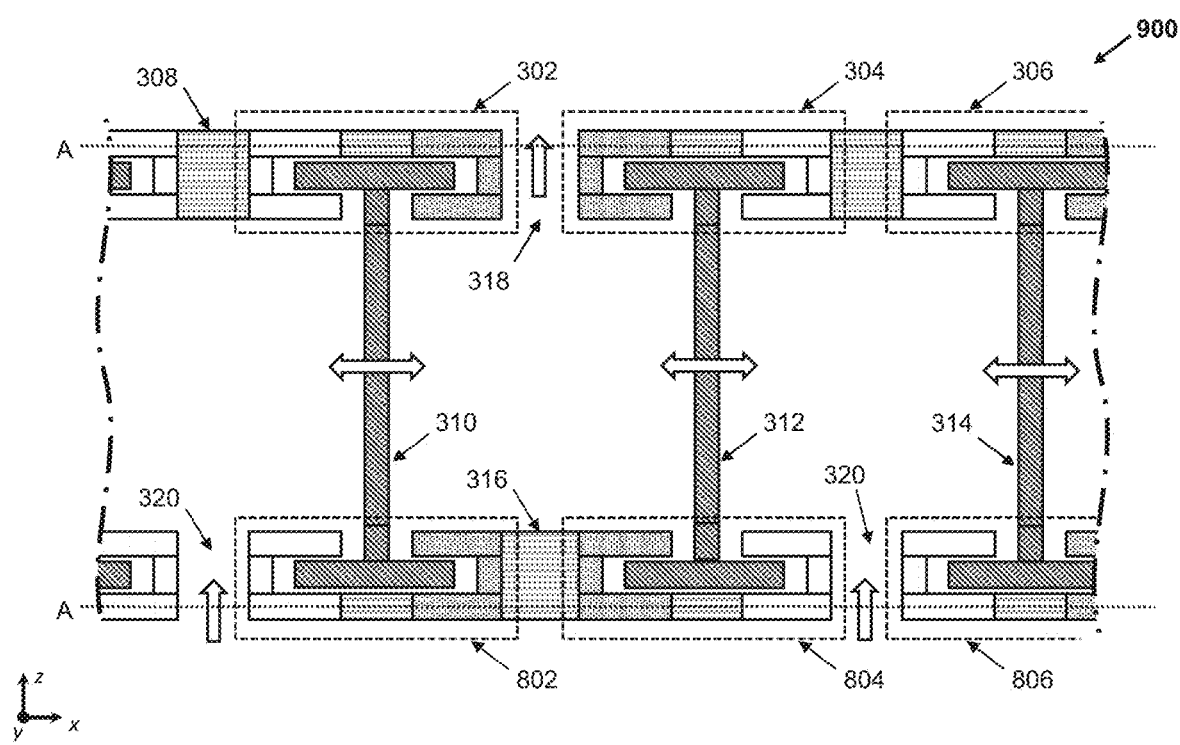
FIG. 9 shows a cross section of a portion of a microelectromechanical acoustic pressure-generating device in accordance with an exemplary embodiment of the invention, where actuator drive portions are formed in the cover and base of the microelectromechanical acoustic pressure-generating device.

FIG. 9 shows another cross section of a portion of a microelectromechanical acoustic pressure-generating device in accordance with an exemplary embodiment of the invention. In this exemplary embodiment, actuator drive portions 302, 304, 306, 802, 804, 806 are formed in the cover layer 308/408 and base layer 316 of a microelectromechanical acoustic pressure-generating device 900. The actuator drive portions 802, 804, 806 are substantially identical to the drive portions of 302, 304, 360 described hereinabove, but they are "flipped around" in the z-direction. Accordingly, both ends of the actuators 310, 312, 314 are provided with legs 506 as described in connection with the FIGS. 5A and 5B above, so that both ends of the actuators 310, 312, 314 have a substantially T-shaped, cross section in the x-y-plane. Alternatively, both ends of the actuators 310, 312, 314 may be configured as described in connection with FIGS. 7A and 7B. In this latter case, actuator drive portions 802, 804, 806 would be configured as shown in FIGS. 7A and 7B as well.

Figure 10A:
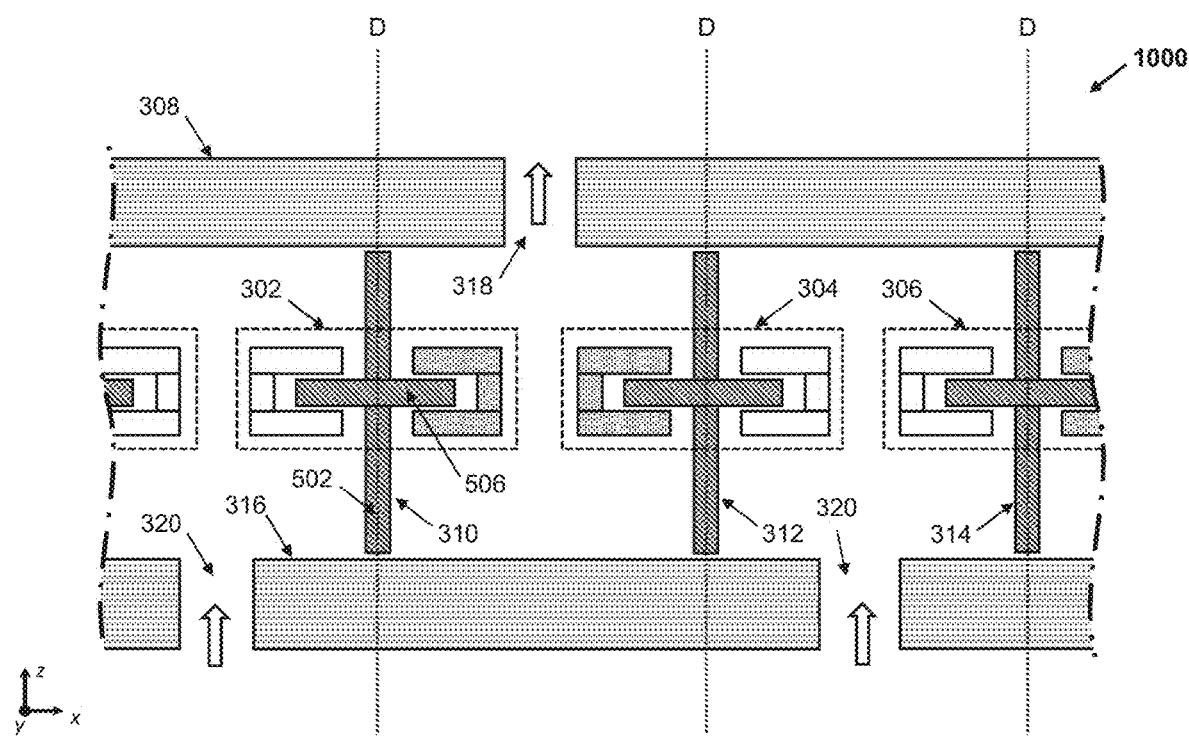
FIGS. 10A & 10B shows a cross section of a portion of a microelectromechanical acoustic pressure-generating device in accordance with another exemplary embodiment of the invention, where actuator drive portions are formed in the actuator layers of the microelectromechanical acoustic pressure-generating device.
Figure 10B:
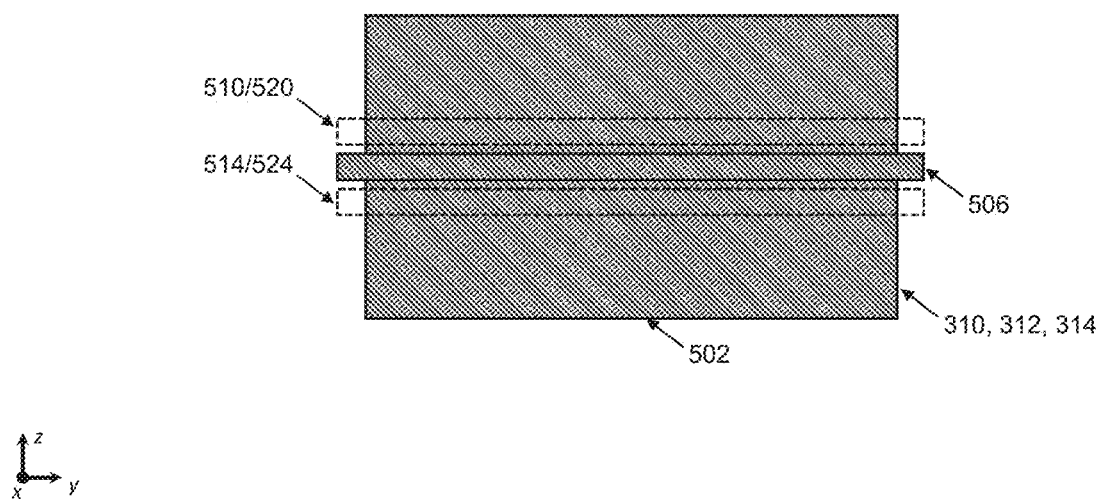

FIGS. 10A and 10B shows additional cross sections of a portion of a microelectromechanical acoustic pressure-generating device in accordance with another exemplary embodiment of the invention. In this exemplary embodiment, actuator drive portions 302, 304, 306 are formed in the actuator layer 204 of the microelectromechanical acoustic pressure-generating device 1000. In the shown embodiment, the actuator drive portions 302, 304, 306 and the corresponding legs 506 attached to the fin 502 of the actuator 310, 312, 314 are provided substantially at the center in between the cover layer 308 and the base layer 316. In one example implementation a separate leg 506 is connected through a connection structure of 504 with fin 502 at either side of the fin 502 (in x-direction). Alternatively, a single leg 506 could be formed and two fin portions extending (substantially) in the y-z-plane may be connected to the leg 506 through a connecting structure 504. FIG. 10B shows a cross-section along line D in FIG. 10A. In the illustrated example, the leg 506 is longer in the y-direction then the fin 502. Also, the length of the electrode portions 510/520 and 514/524 of the electrode arrangements of the actuator drive portion 302, 304, 306 is longer than the fin 502 in y-direction. However, as explained above, this is only an example, and the electrode portions 510/520 and 514/524 of the electrode arrangements as well as the leg 506 could be also shorter than or equal to the length of the fin 502 in y-direction. Furthermore, FIGS. 10A and 10B show the configuration of the actuator drive portions 302, 304, 306 as illustrated in connection with FIGS. 5A and 5B. However, the actuator drive portion 302, 304, 306 could be also realized by the actuator drive portions illustrated in connection with FIGS. 7A and 7B or any other actuator drive portion described herein.

It is further noted that the drive force $F_x$ has been approximated previously in connection with the assumption of static potentials $+V_{dc}$ or $-V_{dc}$ being applied to the electrode arrangements within a given actuator drive portion 302, 304, 306, whereas at least the leg 506 or that legs 506, 606 receive varying potential $V_{ac}$ (e.g. corresponding to the sound signal to be reproduced). However, the driving of the actuator drive portions and actuators is not limited to this driving scheme, and all potentials for driving the actuators 230, 310, 312, 314 may be variable. The actuator drive portions and actuators may also be driven using the scheme described in the co-pending application PCT/EP2022/050732 filed on 14 Jan. 2022 in the name of Arioso Systems GmbH and Fraunhofer-Gesellschaft zur Förderung der angewandten Forschung e.V., which is incorporated herein by reference. In line with this disclosure, and particularly in line with the disclosure in connection with FIGS. 6-12 and FIGS. 15 and 16 of co-pending application PCT/EP2022/050732, the electrode arrangements within a given actuator drive portion 302, 304, 306 may also be driven with variable potentials noting that the electrode arrangements forming the two electrodes within a given actuator drive portion 302, 304, 306 correspond to the electrodes E1 and E2 in the disclosure of co-pending application PCT/EP2022/050732, and the actuators 230, 310, 312, 314 (or at least the leg 506 or the legs 506, 606 that receive the varying potential $V_{ac}$) correspond to the electrode E0 in the disclosure of co-pending application PCT/EP2022/050732.

Figure 11:
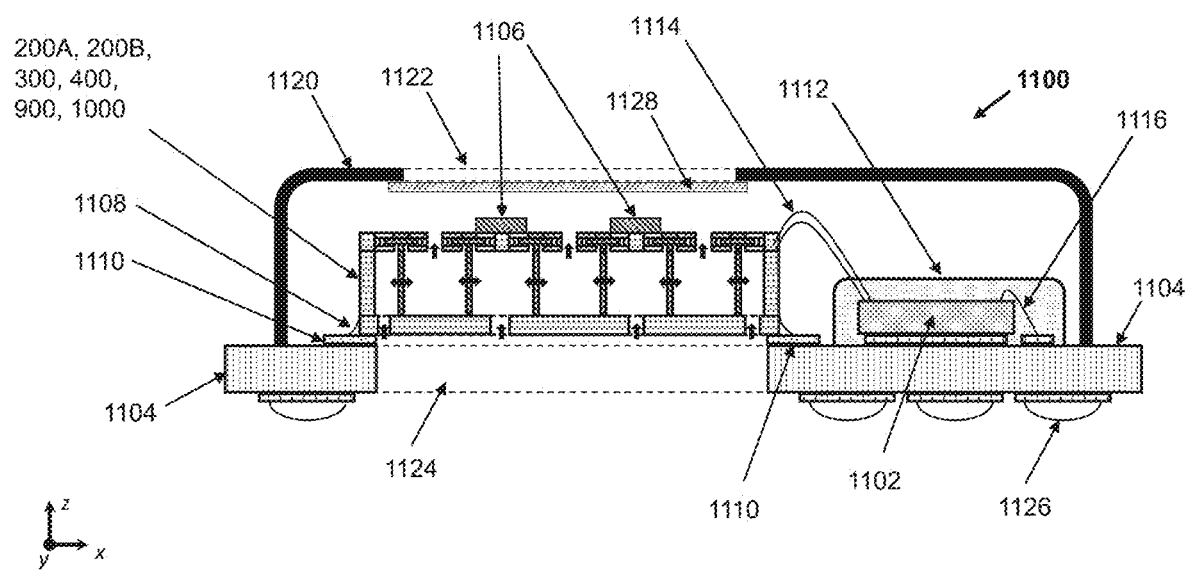
FIG. 11 shows an exemplary embodiment of a microelectromechanical loudspeaker system 1100 according to embodiments of the invention.

FIG. 11 shows an exemplary embodiment of a microelectromechanical loudspeaker system 1100 according to embodiments of the invention. The microelectromechanical loudspeaker system 1100 comprises a microelectromechanical acoustic pressure-generating device 200A, 200B, 300, 400, 900, 1000 according to one of the various embodiments thereof described herein. In this embodiment, the acoustic pressure generated by the device 200A, 200B, 300, 400, 900, 1000 may be, for example, sound, ultrasound or voice but the acoustic pressure may not be limited to signals in the audible frequency range of humans. The microelectromechanical loudspeaker system 1100 may be for example used in a headphone, an in-ear headphone, a near-field speaker, a hearing aid, etc.

In the example loudspeaker system 1100, the base layer 206 of the microelectromechanical acoustic pressure-generating device 200A, 200B, 300, 400, 900, 1000 may be mounted, for example, on one upper side of a carrier, such as a printable circuit board (PCB) 1104. The PCT 1104 may be provided with an opening or cutout region 1124. The microelectromechanical acoustic pressure-generating device 200A, 200B, 300, 400, 900, 1000 is mounted to the PCB 1104 in an area on the top side of the PCB that corresponds to the opening or cutout region 1124, so that the opening or cutout region 1124 is provided substantially underneath the base of the microelectromechanical acoustic pressure-generating device 200A, 200B, 300, 400, 900, 1000. A border area of the base layer 206, 316 of the microelectromechanical acoustic pressure-generating device 200A, 200B, 300, 400, 900, 1000 may (at least partially) overlap with the PCB 1104, and the microelectromechanical acoustic pressure-generating device 200A, 200B, 300, 400, 900, 1000 may be mounted to the top side of the PCB 1104 at the border area, e.g. using an adhesive 1110. The adhesive 1110 may optionally be an electrically conducing adhesive so that the adhesive 1110 facilitates the electric connection between the microelectromechanical acoustic pressure-generating device 200A, 200B, 300, 400, 900, 1000 and conductive paths in the PCB 1104. Furthermore, a sealing 1108 may be provided around the outer edges of the microelectromechanical acoustic pressure-generating device 200A, 200B, 300, 400, 900, 1000.

The PCB 1104 may provide electric interconnections for conducting the static/variable potentials required to drive the actuators 230, 310, 312, 314 using the actuator drive portions 210, 302, 304, 306 in the manner described above. For this, one or more drive units may process a sound signal or an audio signal received from a processing unit 1102 of the microelectromechanical loudspeaker system 1100. The one or more drive units may generate, based on the sound or audio signal, the static/variable potentials (e.g. $+V_{dc}$, $-V_{dc}$ and $V_{ac}$) required to drive the actuators 230, 310, 312, 314 using the actuator drive portions 210, 302, 304, 306 in the manner described above. The drive units may be for example provided as part of the processing unit 1102 but may also be formed by discrete elements mounted on the PCB 1104. The sound or audio signal may be either a digital signal or an analog signal. The processing unit 1102 may implement a control system configured to control the acoustic pressure generation of the microelectromechanical acoustic pressure-generating device 200A, 200B, 300, 400, 900, 1000.

The processing unit 1102 could be for example realized as a Digital Signal Processor (DSP), an Application Specific Integrated Circuit (ASIC), Field Programmable Array (FPGA) or Programmable Logic Device (PLD), or a hybrid component including hardwired circuitry and programmable logic. For example, the drive units, when integrated in a processing unit 1102, could be implemented using hardwired circuitry of the processing unit 1102. Further, in other example implementations, the functionality of the processing unit 1102 could be provided by multiple discrete circuit components, e.g. more than one DSP, ASIC, FPGA, PLD or a combination thereof that may all be mounted to the PCB 1104 using techniques described below.

In the example shown in FIG. 11, the processing unit 1102 is mounted to the top side of the PCB 1104 using known bonding techniques (e.g. wire bonding, chip bonding, ball bonding, etc.) to facilitate communication of signals between the processing unit 1102 and the microelectromechanical acoustic pressure-generating device 200A, 200B, 300, 400, 900, 1000 through the conductive paths provided in the PCB 1104 that cause driving actuators 230, 310, 312, 314 using the actuator drive portions 210, 302, 304, 306 in the manner described above. Alternatively or additionally, the processing unit 1102 could also be connected to the microelectromechanical acoustic pressure-generating device 200A, 200B, 300, 400, 900, 1000 through bond wires 1114 to facilitate communication of signals that cause driving actuators 230, 310, 312, 314 using the actuator drive portions 210, 302, 304, 306 in the manner described above. Further optionally or alternatively, bond wires 1116 could be used for electric connection of the processing unit 1102 and the conductive paths of the PCB 1104. The processing unit 1102 and the optional bond wires 1114, 1116 may be encases in a glob-top 1112.

The bonding of between the processing unit 1102 and the conductive paths of the PCB 1104 may further connect the processing unit 1102 to other device components external to the microelectromechanical loudspeaker system 1100 though bonding (e.g. using grid-balls 1126) provided on the other, bottom surface side of the PCB 1104. For example, the microelectromechanical loudspeaker system 1100 may be part of a larger acoustic device, such as in-ear headphones, a hearing aid or the like. Such devices may also provide a back-volume for the microelectromechanical loudspeaker system 1100.

The microelectromechanical acoustic pressure-generating device 200A, 200B, 300, 400, 900, 1000 and the processing unit 1102 may be further covered by a cover 1120. The cover 1120 may be for example a metal cover or plastic cover. The cover 1120 may be provided with an acoustic pressure outlet opening 1122 in a position above (in z-direction) the microelectromechanical acoustic pressure-generating device 200A, 200B, 300, 400, 900, 1000 so that the acoustic pressure emitted through the air outlet openings 220 of the microelectromechanical acoustic pressure-generating device 200A, 200B, 300, 400, 900, 1000 is emitted to the outside of the microelectromechanical loudspeaker system 1100 though the acoustic pressure outlet opening 1122. Optionally, multiple such acoustic pressure outlet openings 1122 could be provided. The area in which the acoustic pressure outlet opening(s) 1122 is provided may substantially correspond (in terms of position and/or size) to the dimensions of the microelectromechanical acoustic pressure-generating device 200A, 200B, 300, 400, 900, 1000 in the x-y plane.

To avoid dirt particles entering into the cavity around to the microelectromechanical acoustic pressure-generating device 200A, 200B, 300, 400, 900, 1000 and processing unit 1102 formed by the cover 1120, and acoustic cloth or gauze 1128 (or another suitable acoustic-pressure transparent material) could be used to cover the acoustic pressure outlet opening(s) 1122. In some embodiments, the microelectromechanical loudspeaker system 1100 may optionally include one or more microphones 1106 that are mounted on the cover layer 308, 408 or integrated in the cover layer 308, 408 of the microelectromechanical acoustic pressure-generating device 200A, 200B, 300, 400, 900, 1000. The microphone(s) 1106 may be for example is positioned adjacent to at least one acoustic pressure-outlet opening 318 provided in the cover layer 308, 408 in between a pair actuator drive portions 210, 302, 304, 306. Further optionally, the microelectromechanical loudspeaker system 1100 may implement an active noise cancelling (ANC) function. The microphone(s) 1106 detect an acoustic pressure emitted through the acoustic pressure-outlet opening(s) 318 of the cover layer 308, 408 and interference noise. The processing unit 1102 may implement a control system configured to control the acoustic pressure generation of the microelectromechanical acoustic pressure-generating device 200A, 200B, 300, 400, 900, 1000 based on the acoustic pressure detected by the microphone(s) 1106 and interference noise such that the detected interference noise is suppressed.

The microelectromechanical acoustic pressure-generating device 200A, 200B, 300, 400, 900, 1000 may be formed in a layer process using materials known from conventional semiconductor manufacturing. A part of the process flow could be realized using the method described in the PhD-theses Latifa Louriki, "Mikromechanischer Prozess zur Herstellung mehrlagiger 3D-MEMS (EPyC-Prozess)", submitted on 28 Jan. 2020 at the Fakultät für Elektrotechnik und Informationstechnik der Technischen Universität Chemnitz (Department of Electrical Engineering and Information Technology of the Technical University of Chemnitz). The thesis is available at https://monarch.qucosa.de/api/qucosa%3A74643/attachment/ATT-0/ and is incorporated herein by reference. An example implementation process for manufacturing a microelectromechanical acoustic pressure-generating device 200A, 200B, 300, 400, 900, 1000 according to one of the different embodiments can be summarized as follows. First, several, e.g. three, stacks of SiO2 and polycrystalline silicon are deposited on the surface of a silicon wafer to form the cover layer 202, 308, 408 of the microelectromechanical acoustic pressure-generating device 200A, 200B, 300, 400, 900, 1000. The polycrystalline silicon can be grown epitaxially and have thicknesses in the range of a few μm to a few 100 μm. Targeted openings are formed in the individual layers so that $SiO_2$ layers and layers of polycrystalline silicon can be combined with each other. Next, from the backside of the wafer, the fins 502 of the actuators 230, 310, 312, 314 (and are patterned by deep reactive ion etching (DRIE). Subsequently the fins 502 are passivated by covering the fins 502 from the back with a SiO2.

In a next step, at the end of the device wafer, two release etchings are performed: A gas phase etch with $XeF_2$ (Xenon difluoride) for etching open areas of the poly-crystalline silicon layer cover layer 202, 308, 408 of the wafer. This exposes the air outlet slots 220, 318 and the areas to the right and left of the legs 506. Next, a gas phase etch with HF (hydrogen fluoride) removes all $SiO_2$ layers. This step exposes the air gaps $g_0$ and $g_1$ (and $g_2$ and $g_3$) and the electrodes.

Finally, a second wafer is bonded to the back of the wafer, which contains the air inlet slots of the microelectromechanical acoustic pressure-generating device 200A, 200B, 300, 400, 900, 1000. The actuators 230, 310, 312, 314 (and in particular their fins 502) are thus acoustically sealed.

The invention claimed is:

1. A microelectromechanical acoustic pressure-generating device implemented in a microelectromechanical system (MEMS), wherein the microelectromechanical acoustic pressure-generating device comprises:
   a layer system comprising a plurality of layers, the layers of the layer system forming:
   a planar cover, a planar base and sidewalls arranged to enclose a cavity between the cover and the base, and
   a plurality of movable actuators for generating an acoustic pressure;
   wherein each of the movable actuators comprises:
   a planar first leg extending substantially in the first direction and a second direction perpendicular to the first direction, and
   a planar second leg extending substantially in the first direction and a third direction perpendicular the first direction and the second direction into the cavity;
   wherein the first leg and the second leg are connected to each other through one or more coupling portions;
   wherein a plurality of actuator drive portions is formed in a first subset of the layers of the layered system, wherein each of the actuator drive portions comprises a pair of electrode arrangements;
   wherein each electrode arrangement comprises a planar first electrode portion and a planar second electrode portion, both substantially extending in the first direction and the second direction and spaced from each other in the third direction so as to provide a groove in between the first and second electrode portion of the respective electrode arrangement, wherein the grooves of each electrode arrangement are part of a respective cutout region of a respective actuator drive portion in the first subset of the layers of the layered system, each cutout region being connected with the cavity; and
   wherein each of the actuator drive portions accommodates the first leg of one or more of said actuators in its cutout region, wherein the ends of the first leg of each of the one or more of said actuators protrude into the grooves of the cutout region of the respective actuator drive portion.

2. The microelectromechanical acoustic pressure-generating device according to claim 1, wherein, for each of the actuator drive portions in the subset of the layers of the layered system, a first gap is formed between one end of the second leg of a respective actuator and the first electrode portion of an associated electrode arrangement and a second gap (is formed between the said one end of the second leg of the respective actuator and a second electrode portion of the associated electrode arrangement, wherein the first gap is equal to the second gap.

3. The microelectromechanical acoustic pressure-generating device according to claim 2, wherein, for each of the actuator drive portions, a third gap is formed between the other end of the second leg of a respective actuator and the first planar electrode portion of another associated electrode arrangement and a fourth gap is formed between the said one end of the second leg of the respective actuator and a second electrode portion of the other associated electrode arrangement, wherein the third gap is equal to the fourth gap.

4. The microelectromechanical acoustic pressure-generating device according to claim 3, wherein, for each of the actuator drive portions, the first gap, the second gap, the third gap and the fourth gap are all equal.

5. The microelectromechanical acoustic pressure-generating device according to claim 2, wherein the gap size is in the range inclusive 100 nm and inclusive 1 µm, preferably in the range inclusive 200 nm and inclusive 600 nm.

6. The microelectromechanical acoustic pressure-generating device according to claim 1, wherein the layers of the layered system forming the cover or the base comprise or correspond to the subset of the layers of the layered system in which the actuator drive portions are formed; or wherein the layers in which the second legs of the actuators are formed comprise the subset of the layers of the layered system in which the actuator drive portions are formed.

7. The microelectromechanical acoustic pressure-generating device according to claim 1, wherein the grooves of the pair of electrode arrangement of each actuator drive portion substantially extend in the first direction and the second direction and face each other.

8. The microelectromechanical acoustic pressure-generating device according to claim 1, wherein the first electrode portion and the second electrode portion of each electrode arrangement form a single electrode of the actuator drive portions, and optionally wherein, in each electrode arrangement, an electrically conductive connecting portion extending substantially in the first direction and third direction electrically connects the first electrode portion and the second electrode portion of the respective electrode arrangement.

9. The microelectromechanical acoustic pressure-generating device according to claim 1, wherein, in each electrode arrangement, the distance between the first electrode portion and the second electrode portion is in the range inclusive 50 nm and inclusive 5.0 µm, preferably in the range inclusive 500 nm and inclusive 4.0 µm.

10. The microelectromechanical acoustic pressure-generating device according to claim 1, wherein each of the movable actuators further comprises:
   a planar third leg extending substantially in the first direction and the second direction, wherein the third leg is connected to the second leg though one or more second coupling portions substantially extending in the third direction at the end of the second leg that is opposite the first leg;
   wherein a second plurality of actuator drive portions is formed in another, second subset of the layers of the layered system, wherein each of the second actuator drive portions comprises a pair of second electrode arrangements,
   wherein each second electrode arrangement comprises a planar first electrode portion and a planar second electrode portion, both substantially extending in the first direction and the second direction and spaced from each other in the third direction so as to provide a groove in between the first and second electrode portion of the respective electrode arrangement, wherein the grooves of each electrode arrangement are part of a respective cutout region of a respective second actuator drive portion in the cover, each cutout region being connected with the cavity;
   wherein each of the second actuator drive portions accommodates the third leg of one or more of said actuators in its cutout region, wherein the ends of the third leg of each of the one or more of said actuators protrude into the grooves of the cutout region of the respective second actuator drive portion.

11. The microelectromechanical acoustic pressure-generating device according to claim 1, wherein each of the movable actuators further comprises:
- a planar third leg extending substantially in the first direction and the second direction, wherein the third leg is connected to the first leg though one or more coupling portions substantially extending in the third direction;
- wherein each electrode arrangement of the actuator drive portions further comprises:
- a planar third electrode portion extending in the first direction and the second direction and spaced from the second electrode portion in the third direction so as to provide an additional groove of the electrode arrangement in the cutout region of the actuator drive portion; and
- wherein each of the actuator drive portions accommodates the third leg of one or more of said actuators, wherein the ends of the third leg of each of the one or more of said actuators protrude into the grooves of the cutout region of the respective actuator drive portion.

12. The microelectromechanical acoustic pressure-generating device according to claim 11, wherein in each electrode arrangement, an electrically conductive connecting portion extending substantially in the first direction and third direction electrically connects the second electrode portion and the third electrode portion of the respective electrode arrangement.

13. The microelectromechanical acoustic pressure-generating device according to claim 11, wherein, in each electrode arrangement, the first, second, third electrode portions and their connecting portions jointly have an E-shaped cross section in a plane normal to the first direction.

14. The microelectromechanical acoustic pressure-generating device according to claim 12, wherein each of the movable actuators further comprises:
- a planar fourth leg extending substantially in the first direction and the second direction, wherein the fourth leg is connected to the second leg though one or more second coupling portions substantially extending in the third direction at the end of the second leg that is opposite the first leg;
- wherein a second plurality of actuator drive portions is formed in another, second subset of the layers of the layered system, wherein each of the second actuator drive portions comprises a pair of second electrode arrangements,
- wherein each second electrode arrangement comprises a planar first electrode portion and a planar second electrode portion, both substantially extending in the first direction and the second direction and spaced from each other in the third direction so as to provide a groove in between the first and second electrode portion of the respective electrode arrangement, wherein the grooves of each electrode arrangement are part of a respective cutout region of a respective second actuator drive portion in the cover, each cutout region being connected with the cavity;
- wherein each of the second actuator drive portions accommodates the fourth leg of one or more of said actuators in its cutout region, wherein the ends of the fourth leg of each of the one or more of said actuators protrude into the grooves of the cutout region of the respective second actuator drive portion.

15. A microelectromechanical loudspeaker system implemented as a system-on-chip or system-in-package, comprising a microelectromechanical acoustic pressure-generating device, wherein the microelectromechanical acoustic pressure-generating device comprises:
- a layer system comprising a plurality of layers, the layers of the layer system forming:
- a planar cover, a planar base and sidewalls arranged to enclose a cavity between the cover and the base, and
- a plurality of movable actuators for generating an acoustic pressure;
- wherein each of the movable actuators comprises:
- a planar first leg extending substantially in the first direction and a second direction perpendicular to the first direction, and
- a planar second leg extending substantially in the first direction and a third direction perpendicular the first direction and the second direction into the cavity;
- wherein the first leg and the second leg are connected to each other through one or more coupling portions;
- wherein a plurality of actuator drive portions is formed in a first subset of the layers of the layered system, wherein each of the actuator drive portions comprises a pair of electrode arrangements;
- wherein each electrode arrangement comprises a planar first electrode portion and a planar second electrode portion, both substantially extending in the first direction and the second direction and spaced from each other in the third direction so as to provide a groove in between the first and second electrode portion of the respective electrode arrangement, wherein the grooves of each electrode arrangement are part of a respective cutout region of a respective actuator drive portion in the first subset of the layers of the layered system, each cutout region being connected with the cavity; and
- wherein each of the actuator drive portions accommodates the first leg of one or more of said actuators in its cutout region, wherein the ends of the first leg of each of the one or more of said actuators protrude into the grooves of the cutout region of the respective actuator drive portion.

* * * * *